US007814262B2

(12) United States Patent
Sinclair

(10) Patent No.: US 7,814,262 B2
(45) **Date of Patent: *Oct. 12, 2010**

(54) MEMORY SYSTEM STORING TRANSFORMED UNITS OF DATA IN FIXED SIZED STORAGE BLOCKS

(75) Inventor: Alan W. Sinclair, Falkirk (GB)

(73) Assignee: SanDisk Corporation, Milpitas, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 11/250,794

(22) Filed: Oct. 13, 2005

(65) Prior Publication Data

US 2007/0088904 A1 Apr. 19, 2007

(51) Int. Cl.
*G06F 12/00* (2006.01)
*G06F 13/00* (2006.01)
*G06F 13/28* (2006.01)
*G06F 13/12* (2006.01)
*G06F 13/38* (2006.01)

(52) U.S. Cl. ........................................ 711/103; 710/68

(58) Field of Classification Search ....................... None
See application file for complete search history.

(56) References Cited

U.S. PATENT DOCUMENTS

| | | | |
|---|---|---|---|
| 4,800,520 | A | 1/1989 | Iijima |
| 4,802,117 | A | 1/1989 | Chrosny et al. |
| 5,226,155 | A | 7/1993 | Iijima |
| 5,341,339 | A | 8/1994 | Wells |
| 5,369,754 | A | 11/1994 | Fandrich et al. |
| 5,388,083 | A | 2/1995 | Assar et al. |
| 5,404,485 | A | 4/1995 | Ban |
| 5,570,315 | A | 10/1996 | Tanaka et al. |
| 5,592,662 | A | 1/1997 | Sawada et al. |
| 5,592,669 | A | 1/1997 | Robinson et al. |
| 5,602,987 | A | 2/1997 | Harari et al. |
| 5,619,690 | A | 4/1997 | Matsumani et al. |
| 5,634,050 | A | 5/1997 | Krueger et al. |
| 5,774,397 | A | 6/1998 | Endoh et al. |
| 5,799,168 | A | 8/1998 | Ban |
| 5,809,558 | A | 9/1998 | Matthews et al. |
| 5,832,493 | A | 11/1998 | Marshall et al. |

(Continued)

FOREIGN PATENT DOCUMENTS

DE 10234971 A1 2/2004

(Continued)

OTHER PUBLICATIONS

Kjelsø et al., Memory Management in Flash-Memory disks with Data Compression, 1995, Springer-Verlag, pp. 399-413 +cover.*

(Continued)

*Primary Examiner*—Brian R Peugh
*Assistant Examiner*—Gary C Cygiel
(74) *Attorney, Agent, or Firm*—Davis Wright Tremaine LLP

(57) ABSTRACT

A change in the amount of data to be stored that results from various encoding, compression, encryption or other data transformation algorithms, is handled by individually identifying distinct units of the transformed data and storing such units in physical succession within storage blocks of a memory system such as flash memory. The data being stored may come from a host system external to the memory system or from an application running on a processor within the memory system.

14 Claims, 15 Drawing Sheets

U.S. PATENT DOCUMENTS

| | | | | |
|---|---|---|---|---|
| 5,867,641 | A | 2/1999 | Jenett | |
| 5,896,393 | A | 4/1999 | Yard et al. | |
| 5,907,854 | A | 5/1999 | Kerns | |
| 5,928,347 | A | 7/1999 | Jones | |
| 5,933,846 | A | 8/1999 | Endo | |
| 5,937,425 | A | 8/1999 | Ban | |
| 5,966,720 | A | 10/1999 | Itoh et al. | |
| 5,987,478 | A | 11/1999 | See et al. | |
| 6,014,724 | A | 1/2000 | Jenett | |
| 6,021,415 | A | 2/2000 | Cannon et al. | |
| 6,038,636 | A | 3/2000 | Brown, III et al. | |
| 6,046,935 | A | 4/2000 | Takeuchi et al. | |
| 6,069,827 | A | 5/2000 | Sinclair | |
| 6,145,069 | A * | 11/2000 | Dye | 711/170 |
| 6,148,354 | A | 11/2000 | Ban et al. | |
| 6,189,081 | B1 * | 2/2001 | Fujio | 711/171 |
| 6,216,204 | B1 | 4/2001 | Thiriet | |
| 6,226,728 | B1 | 5/2001 | See et al. | |
| 6,256,690 | B1 | 7/2001 | Carper | |
| 6,275,804 | B1 | 8/2001 | Carl et al. | |
| 6,279,069 | B1 | 8/2001 | Robinson et al. | |
| 6,373,746 | B1 | 4/2002 | Takeuchi et al. | |
| 6,385,690 | B1 * | 5/2002 | Iida et al. | 711/103 |
| 6,412,040 | B2 | 6/2002 | Hasbun et al. | |
| 6,426,893 | B1 | 7/2002 | Conley et al. | |
| 6,446,140 | B1 | 9/2002 | Nozu | |
| 6,456,528 | B1 | 9/2002 | Chen | |
| 6,467,021 | B1 | 10/2002 | Sinclair | |
| 6,477,616 | B1 | 11/2002 | Takahashi | |
| 6,480,935 | B1 | 11/2002 | Carper et al. | |
| 6,484,937 | B1 | 11/2002 | Devaux et al. | |
| 6,490,649 | B2 | 12/2002 | Sinclair | |
| 6,493,811 | B1 | 12/2002 | Blades et al. | |
| 6,522,580 | B2 | 2/2003 | Chen et al. | |
| 6,535,949 | B1 | 3/2003 | Parker | |
| 6,542,407 | B1 | 4/2003 | Chen et al. | |
| 6,547,150 | B1 | 4/2003 | Deo et al. | |
| 6,567,307 | B1 | 5/2003 | Estakhri | |
| 6,598,114 | B2 | 7/2003 | Funakoshi | |
| 6,604,168 | B2 | 8/2003 | Ogawa | |
| 6,668,336 | B2 | 12/2003 | Lasser | |
| 6,684,289 | B1 * | 1/2004 | Gonzalez et al. | 711/103 |
| 6,763,424 | B2 | 7/2004 | Conley | |
| 6,766,432 | B2 | 7/2004 | Saltz | |
| 6,771,536 | B2 | 8/2004 | Li et al. | |
| 6,772,955 | B2 | 8/2004 | Yoshimoto et al. | |
| 6,779,063 | B2 | 8/2004 | Yamamoto | |
| 6,781,877 | B2 | 8/2004 | Cernea et al. | |
| 6,834,331 | B1 | 12/2004 | Liu | |
| 6,886,083 | B2 | 4/2005 | Murakami | |
| 6,895,464 | B2 | 5/2005 | Chow et al. | |
| 6,925,007 | B2 | 8/2005 | Harari et al. | |
| 6,944,742 | B1 * | 9/2005 | Shoff et al. | 711/202 |
| 7,092,911 | B2 | 8/2006 | Yokota et al. | |
| 7,139,864 | B2 | 11/2006 | Bennett et al. | |
| 7,395,384 | B2 | 7/2008 | Sinclair et al. | |
| 2002/0099904 | A1 | 7/2002 | Conley | |
| 2002/0166023 | A1 | 11/2002 | Nolan et al. | |
| 2002/0184436 | A1 | 12/2002 | Kim et al. | |
| 2003/0065866 | A1 | 4/2003 | Spencer | |
| 2003/0065899 | A1 | 4/2003 | Gorobets | |
| 2003/0088812 | A1 | 5/2003 | Lasser | |
| 2003/0109093 | A1 | 6/2003 | Harari et al. | |
| 2003/0147278 | A1 | 8/2003 | Tanaka et al. | |
| 2003/0229753 | A1 | 12/2003 | Hwang | |
| 2003/0229769 | A1 | 12/2003 | Montemayor | |
| 2004/0019716 | A1 | 1/2004 | Bychkov et al. | |
| 2004/0073727 | A1 | 4/2004 | Moran et al. | |
| 2004/0103241 | A1 | 5/2004 | Chang et al. | |
| 2004/0123020 | A1 | 6/2004 | Gonzalez et al. | |
| 2004/0157638 | A1 | 8/2004 | Moran et al. | |
| 2004/0248612 | A1 | 12/2004 | Lee et al. | |
| 2005/0141312 | A1 | 6/2005 | Sinclair et al. | |
| 2005/0141313 | A1 | 6/2005 | Gorobets et al. | |
| 2005/0144357 | A1 | 6/2005 | Sinclair | |
| 2005/0144358 | A1 | 6/2005 | Conley et al. | |
| 2005/0144360 | A1 | 6/2005 | Bennett et al. | |
| 2005/0144363 | A1 | 6/2005 | Sinclair | |
| 2005/0144365 | A1 | 6/2005 | Gorobets et al. | |
| 2005/0144367 | A1 | 6/2005 | Sinclair | |
| 2005/0166087 | A1 | 7/2005 | Gorobets | |
| 2006/0020744 | A1 | 1/2006 | Sinclair et al. | |
| 2006/0020745 | A1 | 1/2006 | Conley et al. | |
| 2006/0031593 | A1 | 2/2006 | Sinclair | |
| 2006/0155920 | A1 | 7/2006 | Smith et al. | |
| 2006/0155921 | A1 | 7/2006 | Gorobets et al. | |
| 2006/0155922 | A1 | 7/2006 | Gorobets et al. | |
| 2006/0161724 | A1 | 7/2006 | Bennett et al. | |
| 2006/0161728 | A1 | 7/2006 | Bennett et al. | |
| 2006/0168395 | A1 | 7/2006 | Deng et al. | |
| 2006/0184718 | A1 | 8/2006 | Sinclair et al. | |
| 2006/0184719 | A1 | 8/2006 | Sinclair | |
| 2006/0184720 | A1 | 8/2006 | Sinclair et al. | |
| 2006/0184722 | A1 | 8/2006 | Sinclair | |
| 2006/0184723 | A1 | 8/2006 | Sinclair et al. | |
| 2007/0030734 | A1 | 2/2007 | Sinclair et al. | |
| 2007/0033323 | A1 | 2/2007 | Gorobets | |
| 2007/0033324 | A1 | 2/2007 | Sinclair | |
| 2007/0033326 | A1 | 2/2007 | Sinclair | |
| 2007/0033328 | A1 | 2/2007 | Sinclair et al. | |
| 2007/0033329 | A1 | 2/2007 | Sinclair et al. | |
| 2007/0033330 | A1 | 2/2007 | Sinclair et al. | |
| 2007/0033331 | A1 | 2/2007 | Sinclair et al. | |
| 2007/0033332 | A1 | 2/2007 | Sinclair et al. | |
| 2007/0033374 | A1 | 2/2007 | Sinclair et al. | |
| 2007/0033375 | A1 | 2/2007 | Sinclair et al. | |
| 2007/0033376 | A1 | 2/2007 | Sinclair et al. | |
| 2007/0033377 | A1 | 2/2007 | Sinclair et al. | |
| 2007/0033378 | A1 | 2/2007 | Sinclair et al. | |
| 2007/0086260 | A1 | 4/2007 | Sinclair | |
| 2007/0186032 | A1 | 8/2007 | Sinclair et al. | |

FOREIGN PATENT DOCUMENTS

| | | | |
|---|---|---|---|
| EP | 0852765 | B1 | 9/2001 |
| EP | 1100001 | B1 | 8/2003 |
| EP | 1 571 557 | A1 | 9/2005 |
| JP | 62-283496 | | 12/1987 |
| JP | H10-069420 | | 3/1998 |
| JP | H10-326227 | A | 12/1998 |
| JP | 2002-251310 | A | 9/2002 |
| JP | 2002-366423 | A | 12/2002 |
| JP | 2003-208352 | A | 7/2003 |
| JP | 2004-526233 | A | 8/2004 |
| JP | 2004-310573 | A | 11/2004 |
| JP | 2005 122439 | | 5/2005 |
| JP | 2006-515086 | A | 5/2006 |
| JP | 2007-520804 | A | 7/2007 |
| WO | WO 00/49488 | | 8/2000 |
| WO | WO 02/29575 | A2 | 4/2002 |
| WO | WO 2004/012027 | A2 | 2/2004 |
| WO | WO 2004/040453 | | 5/2004 |
| WO | WO 2004/040455 | A2 | 5/2004 |
| WO | WO 2004/046937 | A1 | 6/2004 |
| WO | WO 2005/066793 | | 7/2005 |
| WO | WO 2007/047062 | A2 | 4/2007 |

OTHER PUBLICATIONS

Intel AP-686 Application Note, "Flash File System Selection Guide," Dec. 1998, 18 pages.

Ban, Amir, "Local Flash Disks: Two Architectures Compared," M-Systems Flash Disk Pioneers, White Paper, Rev. 1.0, Aug. 2001, 9 pages.

Sinclair, Alan W. et al., U.S. Provisional Application entitled "Direct Data File Storage in Flash Memories", U.S. Appl. No. 60/705,388, filed Aug. 9, 2004, 96 pages.
Rankl, Wolfgang et al., "Smart Card Handbook, Third Edition (translated by Kenneth Cox)", John Wiley & Sons, Ltd., 2004, pp. 52-93, 233-369, and 435-490.
Ban, Amir, "Inside Flash File Systems—Part I", IC Card Systems & Design, Jul./Aug. 1993, pp. 15-16, 18.
Ban, Amir, "Inside Flash File Systems—Part II", IC Card Systems & Design, Sep./Oct. 1993, pp. 21-24.
Chiang, Mei-Ling et al., "Data Management in a Flash Memory Based Storage Server", National Chiao-Tung University, Hsinchu, Taiwan, Dept. of Computer and Information Science, 8 pages.
Kim, Han-Joon et al., "A New Flash Memory Management for Flash Storage System", Computer Software and Applications Conference, 1999. Compsac '99 Proceedings. IEEE Comput. Soc., pp. 284-289.
EPO/ISA, "Notification of Transmittal of the International Search Report and the Written Opinion of the International Searching Authority, or the Declaration," corresponding PCT/ US2006/038008 on May 18, 2007, 12 pages.
Imamiya et al., "A 125-mm2 1-Gb NAND Flash Memory with 10-Mbyte/s Program Speed" Nov. 2002, IEEE Journal of Solid-State Circuits, vol. 37, No. 11, pp. 1493-1501.
PNY Technologies Attache Flash Product, http://web.archive.org/web/20030704092223/http://www.pny.com/products/flash/attache.asp.07/04/2003. pp. 1-2.
Kjelso et al., Memory Management in Flash-Memory Disks with Data Compression, 1995, *Springer-Verlag*, pp. 399-413.
Lim et al., An Efficient NAND Flash File System for Flash Memory Storage, *IEEE Transactions on Computer*, vol. 55, No. 7, Jul. 1, 2006, pp. 906-912.
Kim et al., A Space-Efficient Flash Translation Layer for CompactFlash Systems, *IEEE Transactions on Consumer Electronics*, vol. 48, No. 2, May 2002, pp. 366-375.
Chiang et al., Cleaning Policies in Mobile Computers Using Flash Memory, *Journal of Systems & Software*, vol. 48, 1999, pp. 213-231.
Wu et al., Envy: A Non-Volatile, Main Memory Storage System, *ACM Sigplan Notices*, vol. 29, No. 11, Nov. 1, 2994, pp. 86-97.
Office Action for U.S. Appl. No. 11/250,299 mailed Sep. 10, 2007, 22 pages.
USPTO, "Notice of Allowance and Fee(s) Due," mailed in related U.S. Appl. No. 11/250,299 on Dec. 29, 2008, 29 pages.
USPTO, "Office Action," mailed in related U.S. Appl. No. 11/250,299 on Jun. 26, 2008, 19 pages.

* cited by examiner

PRIOR ART SYSTEM

DIRECT DATA FILE STORAGE SYSTEM

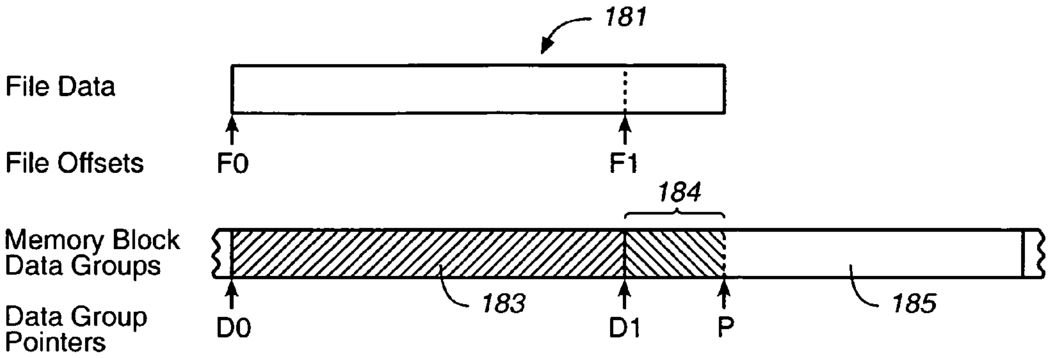
FIG. 11A Write
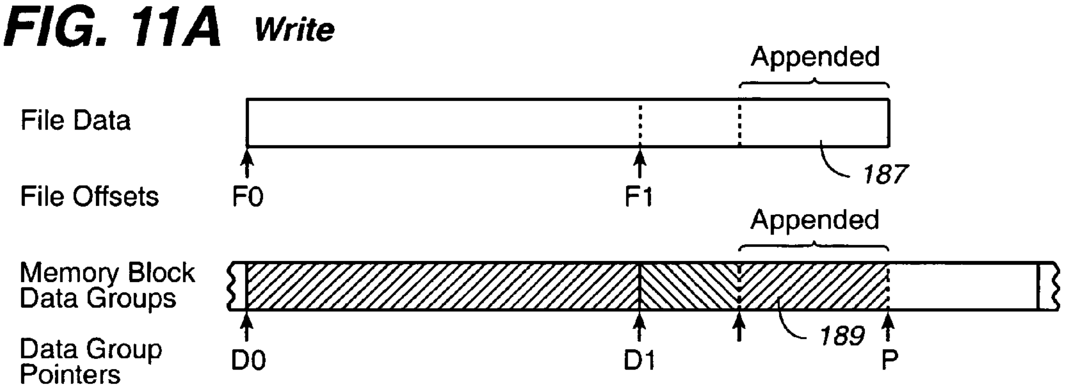
FIG. 11B Write
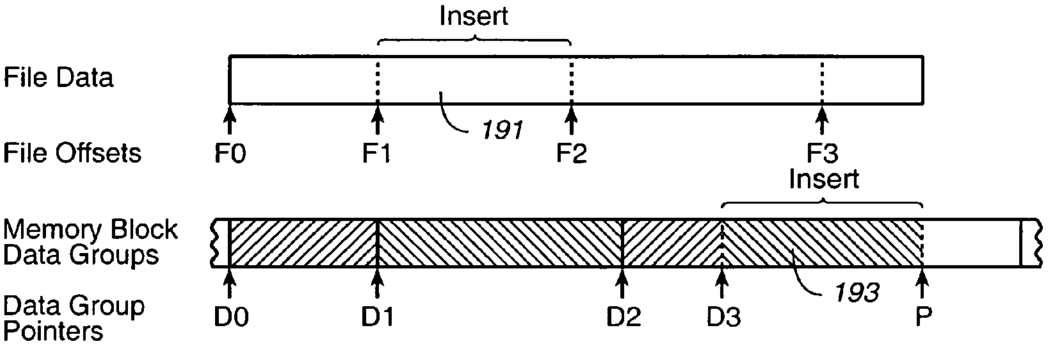
FIG. 11C Insert
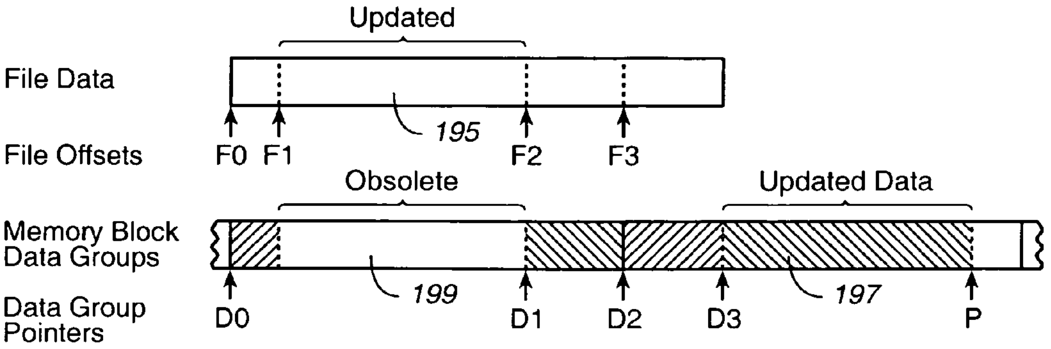
FIG. 11D Update

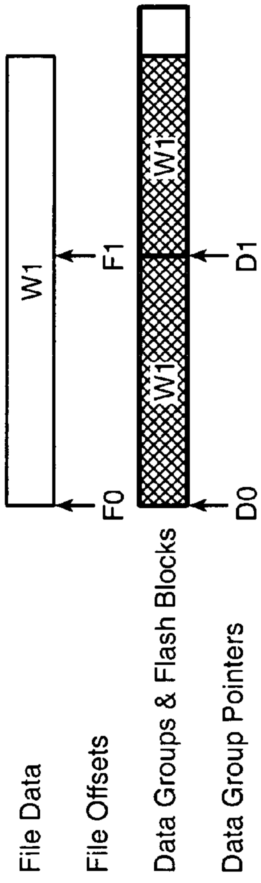
FIG. 12A *Write*
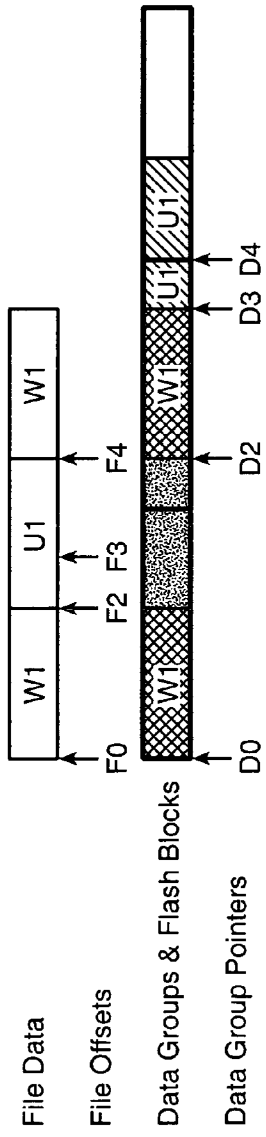
FIG. 12B *Update*
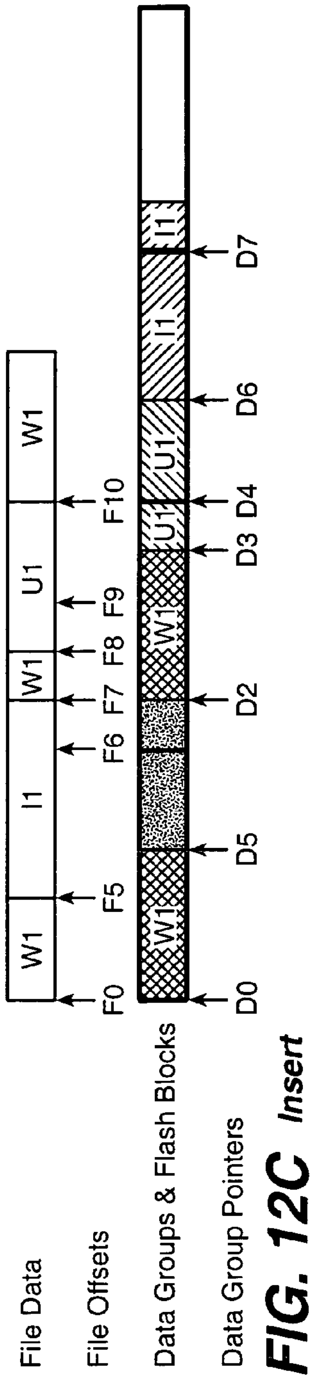
FIG. 12C *Insert*

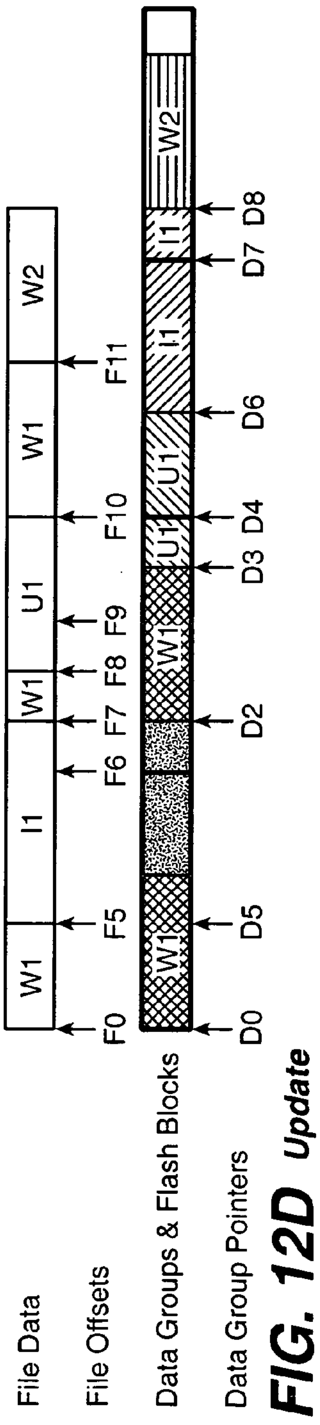
*FIG. 12D* Update
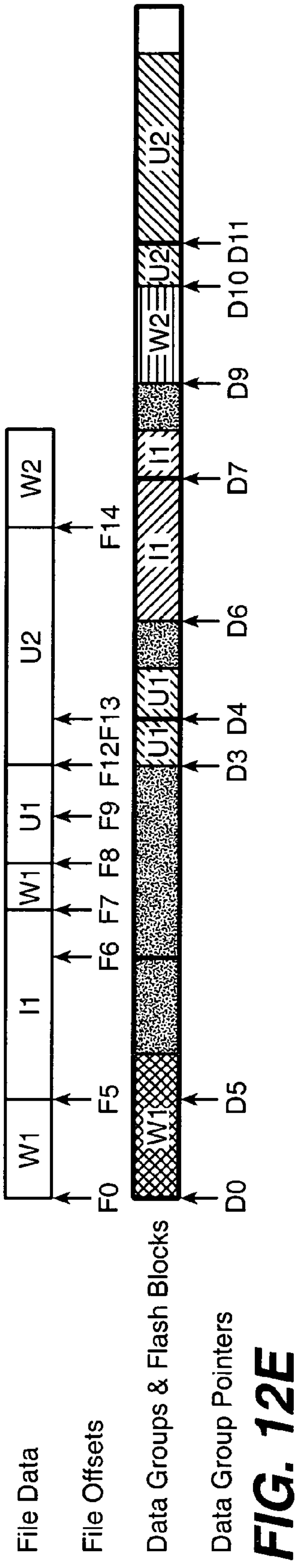
*FIG. 12E*
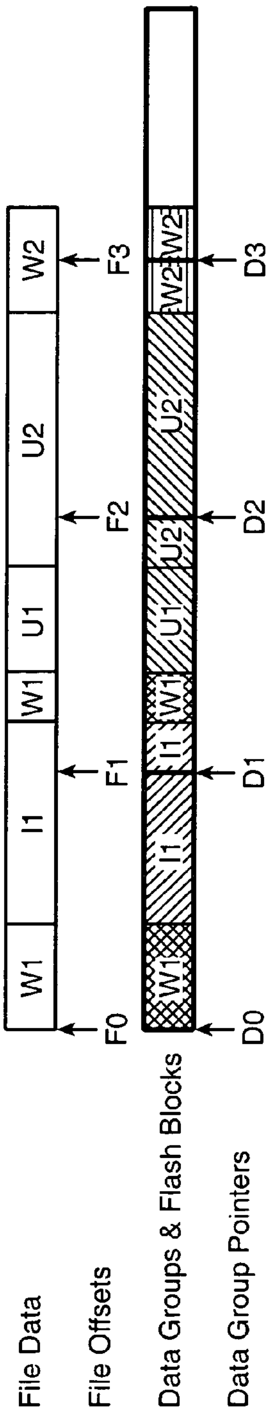
*FIG. 13*

| | Offset Address (235) | Length (237) | Pointer (239) | Fixed (241) | Linked (243) | End of File (245) |
|---|---|---|---|---|---|---|
| | A1 | L1 | X0 | 1 | 0 | 0 |
| | A2 | L2 | X1 | 1 | 0 | 0 |
| | A3 | L3 | X2 | 1 | 0 | 0 |
| | A4 | L4 | X3 | 1 | 0 | 0 |
| 244 → | A5 | L5 | X4 | 1 | 1 | 0 |
| 246 → | -- | -- | Y0 | 1 | 1 | 0 |
| | A6 | L6 | Y1 | 1 | 0 | 0 |
| | A7 | L7 | Y2 | 1 | 0 | 0 |
| | A8 | L8 | Y3 | 1 | 0 | 1 |

FIG. 17

| Offset Address | Length | Pointer | Fixed | Linked | End of File |
|---|---|---|---|---|---|
| A1 | L1 | X0 | 1 | 0 | 0 |
| A2 | L2 | X1 | 1 | 0 | 0 |
| A3 | L3 | X2 | 1 | 0 | 0 |
| A4 | L4 | X3 | 1 | 0 | 0 |
| A5a | L5a | X4 | 1 | 1 | 0 |
| A5b | L5b | Y0 | 1 | 1 | 0 |
| A6 | L6 | Y1 | 1 | 0 | 0 |
| A7 | L7 | Y2 | 1 | 0 | 0 |
| A8 | L8 | Y3 | 1 | 0 | 0 |
| A9a | L9a | Y4 | 1 | 1 | 0 |
| A9b | L9b | Z0 | 1 | 1 | 1 |

FIG. 19

| Offset Address | Length | Pointer | Fixed | Linked | End of File |
|---|---|---|---|---|---|
| A1 | L1 | X0 | 1 | 0 | 0 |
| A2 | L2 | X1 | 1 | 0 | 0 |
| A3 | L3 | X2 | 1 | 0 | 0 |
| A4 | L9 | Z0 | 1 | 0 | 0 |
| A5 | L5 | X4 | 1 | 1 | 0 |
| -- | -- | Y0 | 1 | 1 | 0 |
| A6 | L6 | Y1 | 1 | 0 | 0 |
| A7 | L7 | Y2 | 1 | 0 | 0 |
| A8 | L8 | Y3 | 1 | 0 | 1 |

FIG. 21

MEMORY SYSTEM STORING TRANSFORMED UNITS OF DATA IN FIXED SIZED STORAGE BLOCKS

CROSS-REFERENCE TO RELATED APPLICATIONS

This is related to U.S. patent application Ser. No. 11/250,299, now U.S. Pat. No. 7,529,905 filed Oct. 13, 2005, by Alan W. Sinclair, entitled "Method of Storing Transformed Units of Data in a Memory System Having Fixed Sized Storage Blocks," publication no. US 2007/0086260 A1.

The techniques described herein may be implemented in the flash memory systems described more fully in U.S. patent application Ser. Nos. 11/060,249 (publication no. US 2006/0184720 A1), 11/060,174 (publication no. US 2006/0184718 A1) and 11/060,248 (publication no. US 2006/0184719 A1), all filed Feb. 16, 2005, and provisional application Ser. No. 60/705,388, filed Aug. 3, 2005, collectively referenced hereinafter as the "Direct Data File Applications".

GENERAL BACKGROUND

This application relates to the operation of re-programmable non-volatile memory systems such as semiconductor flash memory, and, more specifically, to the initial storage and subsequent updating of logical units of a data file having different sizes and which change over time. All patents, patent applications, articles and other publications, documents and things referenced herein are hereby incorporated herein by this reference in their entirety for all purposes.

In an early generation of commercial flash memory systems, a rectangular array of memory cells were divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In later generations of flash memory systems, the size of the erase unit was increased to a block of enough memory cells to store multiple sectors of data. Even though host systems with which the memory systems are connected may program and read data in small minimum units such as sectors, a large number of sectors are stored in a single erase unit of the flash memory. It is common for some sectors of data within a block to become obsolete as the host updates or replaces logical sectors of data. Since the entire block must be erased before any data stored in the block can be overwritten, new or updated data are typically stored in another block that has been erased and has remaining capacity for the data. This process leaves the original block with obsolete data that take valuable space within the memory. But that block cannot be erased if there are any valid data remaining in it.

Therefore, in order to better utilize the memory's storage capacity, it is common to consolidate or collect valid partial block amounts of data by copying them into an erased block so that the block(s) from which these data are copied may then be erased and their entire storage capacity reused. It is also desirable to copy the data in order to group data sectors within a block in the order of their logical addresses since this increases the speed of reading the data and transferring the read data to the host. If such data copying occurs too frequently, the operating performance of the memory system can be degraded. This particularly affects operation of memory systems where the storage capacity of the memory is little more than the amount of data addressable by the host through the logical address space of the system, a typical case. In this case, data consolidation or collection may be required before a host programming command can be executed. The programming time is then increased.

The sizes of the blocks are increasing in successive generations of memory systems in order to increase the number of bits of data that may be stored in a given semiconductor area. Blocks storing 256 data sectors and more are becoming common. Additionally, two, four or more blocks of different arrays or sub-arrays are often logically linked together into metablocks in order to increase the degree of parallelism in data programming and reading. Along with such large capacity operating units come challenges in operating the memory system efficiently. The compression, encryption or other transformation of data that results in changed and irregular sized groupings of data being stored makes it even more difficult to maintain an adequate level of performance of the memory system.

SUMMARY OF THE INVENTION

Data to be stored in the memory system are divided into distinct units of addresses, preferably units having an equal amount of data, and the data within the units are transformed, preferably individually, into transformed units of data that are then stored in blocks or metablocks of the memory. Data transformation can occur, for example, by the memory system encoding, compressing or encrypting the data. A transformed data unit usually has a different size than before transformation, either lesser or greater, and the sizes of multiple transformed data units are typically unequal. The stored transformed data units are identified within the memory by data groups having address boundaries that are coincident with those of the transformed data units and any physical boundaries of the blocks or metablocks that might be straddled by the transformed data units. For a transformed data unit that is split into two or more data groups by a physical block boundary, these data groups may be linked together. The varying sized data groups are preferably stored physically contiguously, one after the other in the available space. During any further processing within the memory system, data group boundaries coincident with those of the transformed data units preferably remain separately identified.

These techniques may be implemented with data in the form of individual file objects, each having its own address range, or with multiple file objects that share a common logical address space of the memory system. In either case, the logical address range of the data is divided into distinct data units. After transformation, one or more uniquely identified data groups of the transformed data are mapped into the physical storage locations. In an embodiment, the data group(s) of one transformed data unit are not merged or combined in any way with data group(s) of another transformed data unit, thereby to maintain data of the individual units separately identified. This allows retransforming the data of the stored groups on a unit-by-unit basis when being read out. The data being transformed and stored by the memory system may originate from a host outside of the memory system, or from an application being executed by a processor within the memory system.

Other aspects, advantages, features and details of the present invention are included in a description of exemplary examples thereof that follows, which description should be taken in conjunction with the accompanying drawings.

BRIEF DESCRIPTION OF THE DRAWINGS

FIGS. 11A-11D show four different examples of writing data files directly into a memory;

FIGS. 12A-12E illustrate a sequence of writing a single data file directly into the memory;

FIG. 13 shows the result of garbage collecting the data file illustrated in FIG. 12E;

FIG. 17 is a file index table (FIT) of data stored in the example of FIG. 16;

FIG. 19 is a file index table of data stored after some data are appended thereto according to FIG. 18;

FIG. 21 is a file index table of data stored after being updated according to FIG. 20.

FLASH MEMORY SYSTEM GENERAL DESCRIPTION

A current flash memory system and a typical operation with host devices are described with respect to FIGS. 1-8. It is in such a system that the various aspects of the present invention may be implemented. A host system 1 of FIG. 1 stores data into and retrieves data from a flash memory 2. Although the flash memory can be embedded within the host, the memory 2 is illustrated to be in the more popular form of a card that is removably connected to the host through mating parts 3 and 4 of a mechanical and electrical connector. There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

Figure 1:
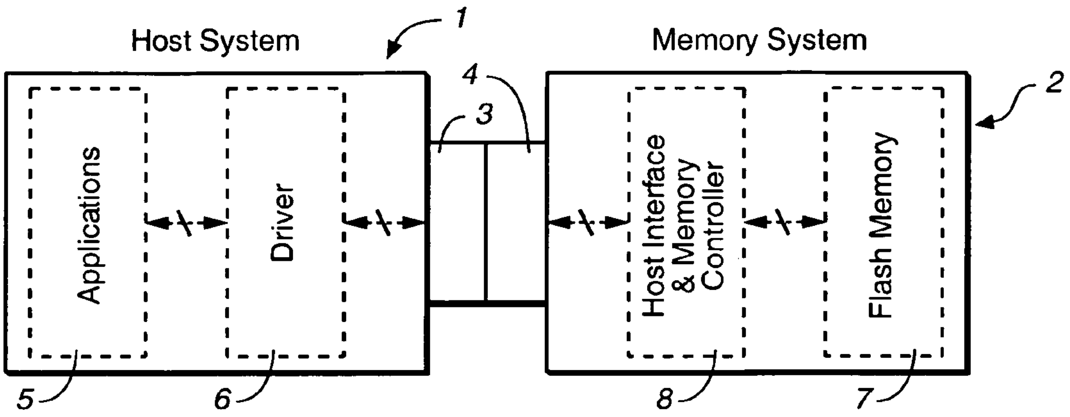
FIG. 1 schematically illustrates a host and a connected non-volatile memory system as currently implemented.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
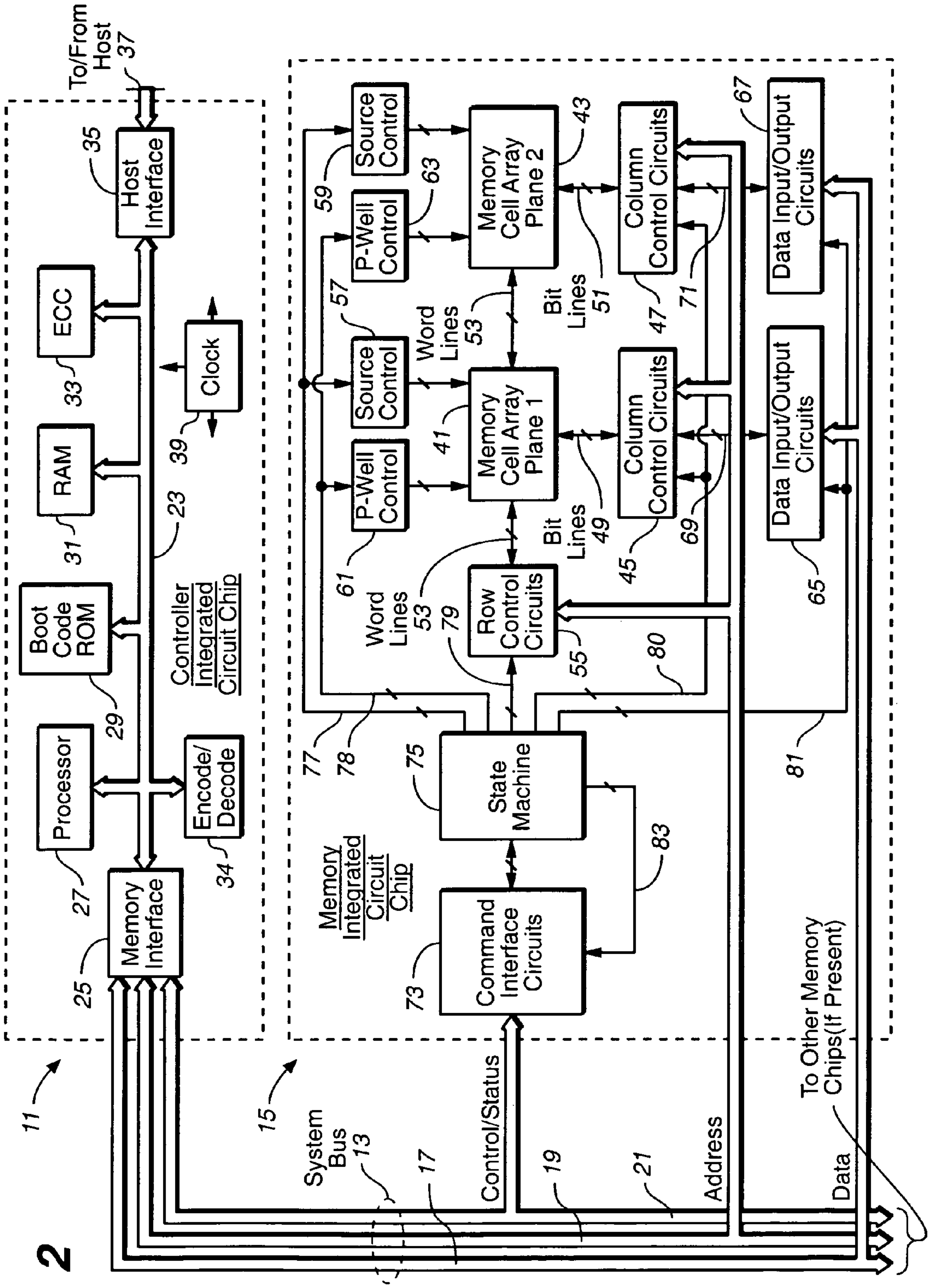
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915,039, filed Aug. 9, 2004, entitled "Ring Bus Structure and It's Use in Flash Memory Systems," publication no. US 2006/0031593 A1.

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system and a random-access-memory (RAM) 31 used primarily to buffer data being transferred between the memory and a host Circuits 33 that calculate and check an error correction code (ECC) for data passing through the controller between the memory and the host may also be connected to the bus 23. A circuit 34 dedicated to encoding and decoding data passing through the controller may also be included. Such encoding includes compression and security encryption but most any type of data transformation may be performed in this manner. The dedicated circuits 33 and 34, when utilized, execute specific algorithms that could otherwise be executed by the processor 27 under firmware control. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 3:
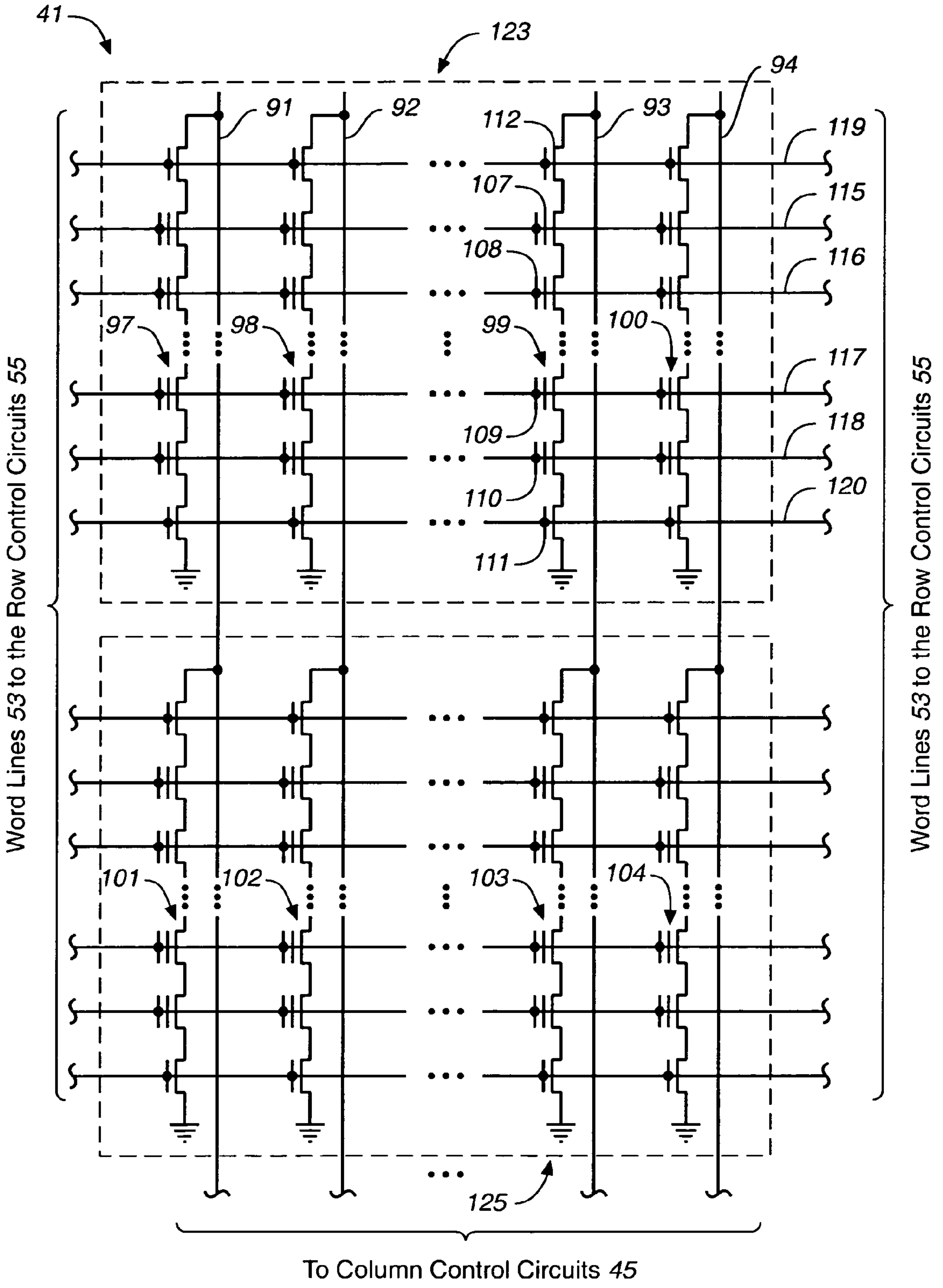
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in United States patent application publication no. 2003/0109093.

Figure 4:
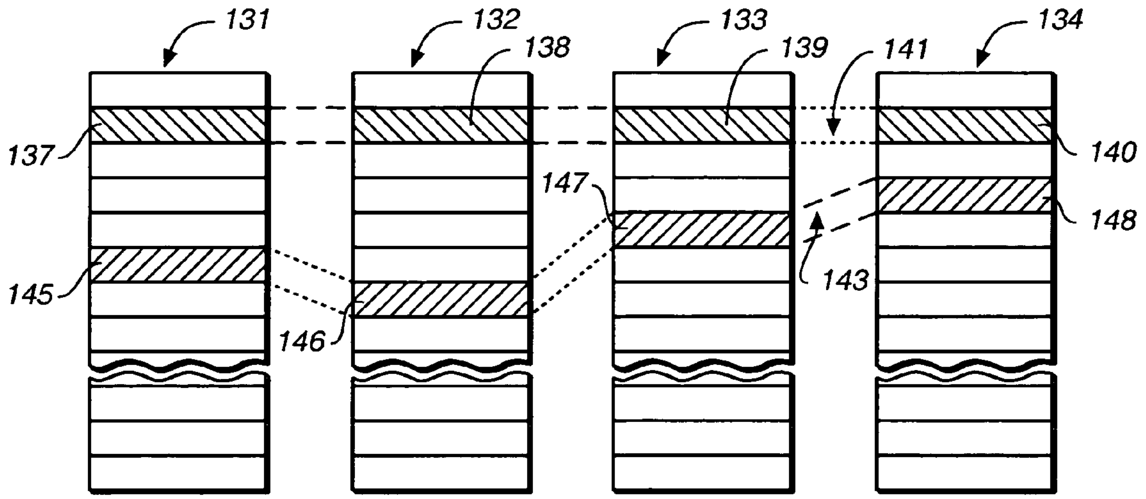
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane. As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
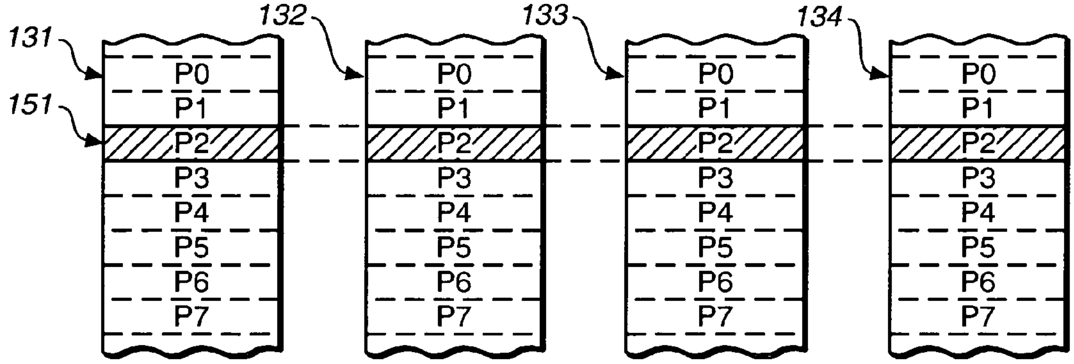
FIG. 5 shows an expanded view of a portion of the physical memory of FIG. 4.

The individual blocks are in turn divided for operational purposes into pages of memory cells, as illustrated in FIG. 5. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 131-134. The metapage 151, for example, includes the page P2 in of each of the four blocks but the pages of a metapage need not necessarily have the same relative position within each of the blocks. Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
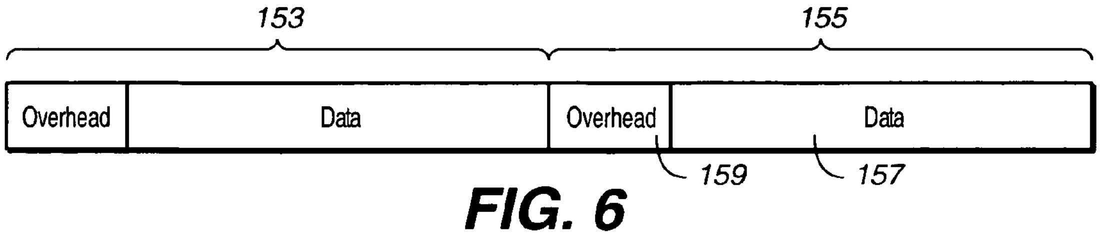
FIG. 6 shows a further expanded view of a portion of the physical memory of FIGS. 4 and 5.

The amount of data in each logical page is typically an integer number of one or more sectors of data, each sector containing 512 bytes of data, by convention. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows are increased. For this reason, the width of flash memories is being extended in order to increase the amount of data in a page and a metapage.

Figure 7:
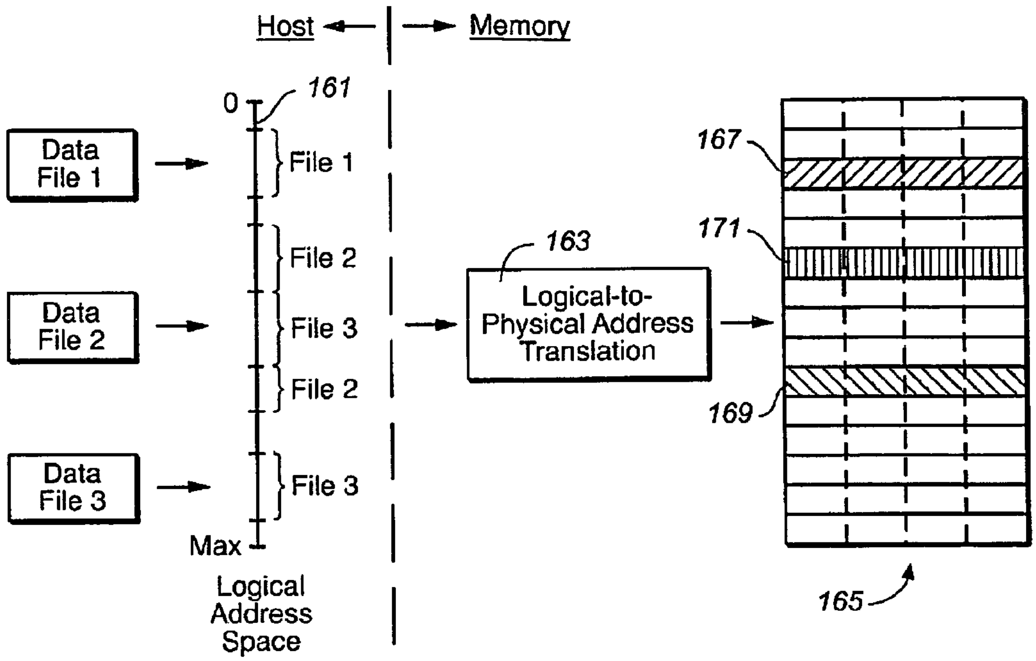
FIG. 7 illustrates a common prior art logical address interface between a host and a re-programmable memory system.

The physically small re-programmable non-volatile memory cards and flash drives identified above are commercially available with data storage capacity of 512 megabytes (MB), 1 gigabyte (GB), 2 GB and 4 GB, and may go higher. FIG. 7 illustrates the most common interface between a host and such a mass memory system. The host deals with data files generated or used by application software or firmware programs executed by the host. A word processing data file is an example, and a drawing file of computer aided design (CAD) software is another, found mainly in general computer hosts such as PCs, laptop computers and the like. A document in the pdf format is also such a file. A still digital video camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

A common logical interface between the host and the memory system is illustrated in FIG. 7. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Files 1, 2 and 3 are shown in the example of FIG. 7 to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 7. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 and other data.

The host keeps track of the memory logical address space by maintaining a file allocation table (FAT), where the logical addresses the host assigns to the various host files are maintained. The FAT table is typically stored in the non-volatile memory, as well as in a host memory, and is frequently updated by the host as new files are stored, other files deleted, files modified and the like. When a host file is deleted, for example, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through a typical host/card interface, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. When the host writes data to the memory system, the controller converts the logical addresses assigned by the host to physical addresses within a metablock in the erased block pool. Other metablocks not being used to store data within the logical address space 161 are then erased and designated as erased pool blocks for use during a subsequent data write operation.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory and data consolidation or garbage collection is needed first to clear one or more metablocks of valid data, which can then be erased. Attention has therefore been directed to managing control of the memory in order to minimize such disruptions. Many such techniques are described in the following U.S. patent application Ser. No. 10/749,831, filed Dec. 30, 2003, entitled "Management of Non-Volatile Memory Systems Having Large Erase Blocks" (publication no. US 2005/0144358 A1); Ser. No. 10/750,155, filed Dec. 30, 2003, entitled "Non-Volatile Memory and Method with Block Management System" (U.S. Pat. No. 7,139,864 B2); Ser. No. 10/917,888, filed Aug. 13, 2004, entitled "Non-Volatile Memory and Method with Memory Planes Alignment" (publication no. US 2005/0141313 A1); Ser. No. 10/917,867, filed Aug. 13, 2004 (publication no. US 2005/0141312 A1); Ser. No. 10/917,889, filed Aug. 13, 2004, entitled "Non-Volatile Memory and Method with Phased Program Failure Handling" (publication no. US 2005/0166087 A1); and Ser. No. 10/917,725, filed Aug. 13, 2004, entitled "Non-Volatile Memory and Method with Control Data Management; (publication no. US 2005/0144365 A1).

One challenge to efficiently control operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, publication no. US 2005/0144357 A1, entitled "Adaptive Metablocks." The fitting of boundaries between blocks of data and physical boundaries between metablocks is described in patent application Ser. No. 10/841,118, filed May 7, 2004, publication no. US 2005/0144363 A1, and Ser. No. 11/016,271, filed Dec. 16, 2004, publication no. US 2005/0144367 A1, entitled "Data Run Programming."

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, U.S. Pat. No. 7,395,384 B2, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, publication no. US 2006/0020745 A1, entitled "FAT Analysis for Optimized Sequential Cluster Management," describes the use of techniques of this type.

To operate the memory system efficiently, it is desirable for the controller to know as much about the logical addresses assigned by the host to data of its individual files as it can. Data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure when the host/memory interface includes the logical address space 161 (FIG. 7), as described above.

Figure 8:
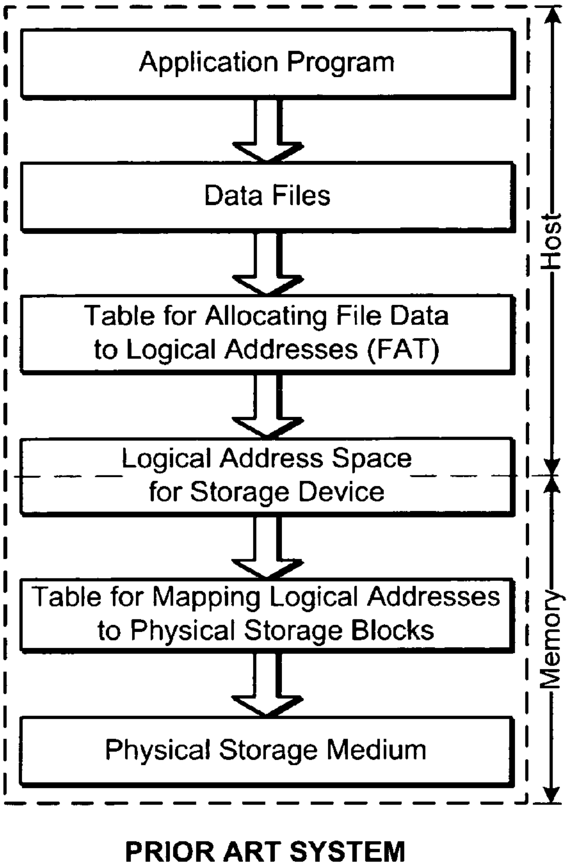
FIG. 8 illustrates in a different manner than FIG. 7 a common prior art logical address interface between a host and a re-programmable memory system.

Referring to FIG. 8, the typical logical address host/memory interface as already shown in FIG. 7 is illustrated differently. The host generated data files are allocated logical addresses by the host. The memory system then sees these logical addresses and maps them into physical addresses of blocks of memory cells where the data are actually stored.

Direct Data File Storage

An improved interface between a host and memory system for the storage of mass amounts of data eliminates use of the logical address space. This is the subject of aforementioned Direct Data File Applications. The host instead logically addresses each file by a unique fileID (or other unique reference) and offset addresses of units of data (such as bytes) within the file. This file address is given directly to the memory system controller, which then keeps its own table of where the data of each host file are physically stored. This new interface can be implemented with the same memory system as described above with respect to FIGS. 2-6. The primary differences with what is described above is the manner in which that memory system communicates with a host system and store the file data.

Figure 9:
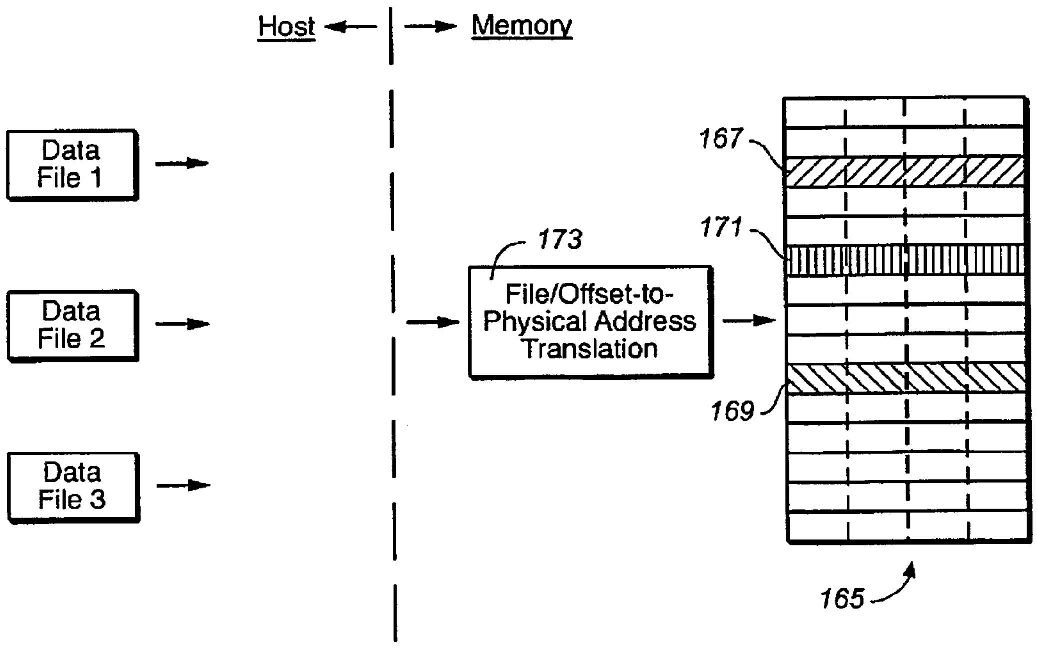
FIG. 9 illustrates a direct data file storage interface between a host and a re-programmable memory system, according to the Direct Data File Applications.

This file-based interface is illustrated in FIG. 9, which should be compared with the logical address interface of FIG. 7. An identification of each of the Files 1, 2 and 3 and offsets of data within the files of FIG. 9 are passed directly to the memory controller. This logical address information is then translated by a memory controller function 173 into physical addresses of metablocks and metapages of the memory 165.

Figure 10:
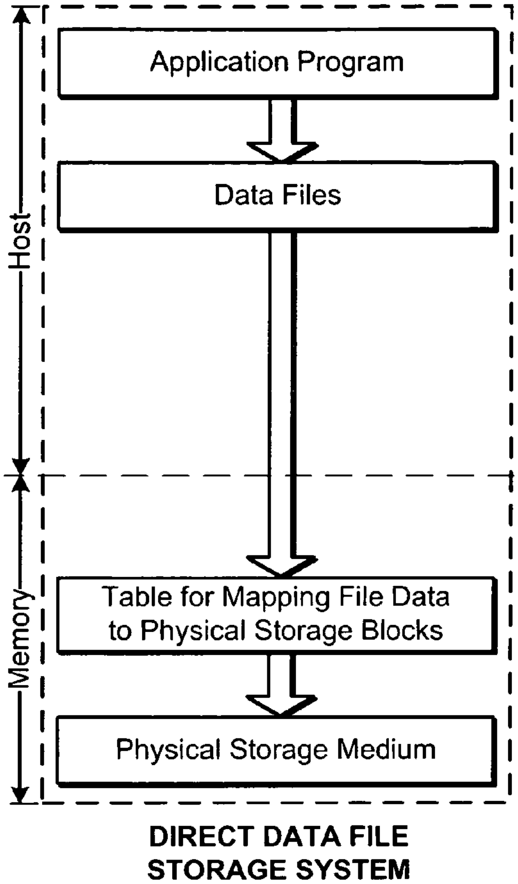
FIG. 10 illustrates in a different manner than FIG. 9 a direct data file storage interface between a host and a re-programmable memory system, according to the Direct Data File Applications.

The file-based interface is also illustrated by FIG. 10, which should be compared with the logical address interface of FIG. 8. The logical address space and host maintained FAT table of FIG. 8 are not present in FIG. 10. Rather, data files generated by the host are identified to the memory system by file number and offsets of data within the file. The memory system then directly maps the files to the physical blocks of the memory cell array.

When a new data file is programmed into the memory with the direct data file storage techniques, the data are written into an erased block of memory cells beginning with the first physical location in the block and proceeding through the locations of the block sequentially in order. The data are programmed in the order received from the host, regardless of the order of the offsets of that data within the file. Programming continues until all data of the file have been written into the memory. If the amount of data in the file exceeds the capacity of a single memory block, then, when the first block is full, programming continues in a second erased block. The second memory block is programmed in the same manner as the first, in order from the first location until either all the data of the file are stored or the second block is full. A third or additional blocks may be programmed with any remaining data of the file. Multiple blocks or metablocks storing data of a single file need not be physically or logically contiguous. For ease of explanation, unless otherwise specified, it is intended that the term "block" as used herein refer to either the block unit of erase or a multiple block "metablock," depending upon whether metablocks are being used in a specific system.

FIGS. 11-13 provide examples of the direct data file operation of flash memory without encoding, compression, encryption or other data transformation taking place within the memory system. Referring to FIG. 11A, the writing of a data file to the memory system is illustrated. A data file 181, in this example, is larger than the storage capacity of one block or metablock 183 of the memory system, which is shown to extend between solid vertical lines. A portion 184 of the data file 181 is therefore also written into a second block 185. These memory cell blocks are shown to be physically contiguous but they need not be. Data from the file 181 are written as they are received streaming from the host until all the data of the file have been written into the memory. In the example of FIG. 11A, the data 181 are the initial data for file, received from the host after a write command has been issued by the host.

A preferred way for the memory system to manage and keep track of the stored data is with the use of variable sized data groups. That is, data of a file are stored as a plurality of groups of data that may be chained together in a defined order to form the complete file. Preferably, however, the order of the data groups within the file is maintained by the memory system controller through use of a file index table (FIT). As a stream of data from the host are being written, a new data group is begun whenever there is a discontinuity either in the logical offset addresses of the file data or in the physical space in which the data are being stored. An example of such a physical discontinuity is when data of a file fills one block and begins to be written into another block. This is illustrated in FIG. 11A, wherein a first data group fills the first block 183 the remaining portion 184 of the file is stored in the second block 185 as a second data group. The first data group can be represented by (F0,D0), where F0 is the logical offset of the beginning of the data file and D0 is the physical location within memory where the file begins. The second data group is represented as (F1,D1), where F1 is the logical file offset of data that is stored at the beginning of the second block 185 and D1 is the physical location where that data are stored.

The amount of data being transferred through the host-memory interface may be expressed in terms of a number of bytes of data, a number of sectors of data, or with some other granularity. A host most often defines data of its files with byte granularity but then groups bytes into sectors of 512 bytes each, or into clusters of multiple sectors each, when communicating with a large capacity memory system through a current logical address interface. This is usually done to simplify operation of the memory system. Although the file-based host-memory interface being described herein may use some other unit of data, the original host file byte granularity is generally preferred. That is, data offsets, lengths, and the like, are preferably expressed in terms of byte(s), the smallest reasonable unit of data, rather than by sector(s), cluster(s) or the like. This allows more efficient use of the capacity of the flash memory storage with the techniques described herein.

In common existing logical address interfaces, the host also specifies the length of the data being written. This can also be done with the file-based interface described herein but since it is not necessary for execution of the write command, it is preferred that the host not provide the length of data being written.

The new file written into the memory in the manner illustrated in FIG. 11A is then represented in a FIT as a sequence of index entries (F0,D0), (F1,D1) for the data groups, in that order. That is, whenever the host system wants to access a particular file, the host sends its fileID or other identification to the memory system, which then accesses its FIT to identify the data groups that make up that file. The length of the individual data groups may also be included in their individual entries, for convenience of operation of the memory system. When used, the memory controller calculates and stores the lengths of the data groups.

So long as the host maintains the file of FIG. 11A in an opened state, a physical write pointer P is also preferably maintained to define the location for writing any further data received from the host for that file. Any new data for the file are written at the end of the file in the physical memory regardless of the logical position of the new data within the file. The memory system allows multiple files to remain open at one time, such as 4 or 5 such files, and maintains a write pointer P for each of them. The write pointers for different files point to locations in different memory blocks. If the host system wants to open a new file when the memory system limit of a number of open files already exists, one of the opened files is first closed and the new file is then opened. After a file has been closed, there is no longer any need to maintain the write pointer P for that file.

FIG. 11B illustrates the appending of data by the host to the end of the previously written but still open file of FIG. 11A, also by use of the write command. Data 187 are shown to be added by the host system to the end of the file, which are also written in the second block 185 at the end of the data for that file. The appended data becomes part of the data group (F1, D1), which therefore now contains more data, since there is neither a logical nor a physical address discontinuity between the existing data group 184 and the appended data 189. The full file is thus still represented as a sequence of index entries (F0,D0), (F1,D1) in the FIT. The address of the pointer P is also changed to that of the end of the stored appended data.

An example of the insertion of a block of data 191 into the previously written file of FIG. 11A is shown in FIG. 11C. Although the host is inserting the data 191 into the file, the memory system appends the inserted data at a location 193 at the end of the file data previously written. It is not necessary to rewrite the data of the file in their logical order when data are being inserted into an open file, although this may be done later in the background after the host closes the file. Since the inserted data is stored entirely within the second memory block 185, if forms a single new group (F1,D3). But the making of this insert results in the previous data group (F0, D0) of FIG. 11A being divided into two groups, one (F0,D0) before the insert and one (F2,D1) after the insert. This is because a new data group needs to be formed whenever there is a logical discontinuity of the data, such as occurs at the beginning F1 of the insert and at the end F2 of the insert. The group (F3,D2) is the result of physical address D2 being the beginning of the second block 185. The groups (F1,D3) and (F3,D2) are maintained separate, even though they are stored in the same memory block, because there is a discontinuity in the offsets of the data stored in them. The original file with the insert is then represented in the memory system FIT by data group index entries (F0,D0), (F1,D3), (F2,D1), (F3,D2), in that order. It should be noted from the examples of FIGS. 11A, 11B and 11C, that new data for a new or existing file may be written without making obsolete any data in the memory. That is, execution of the write and insert commands do not cause any other data to be rendered invalid or obsolete.

FIG. 11D illustrates another example, wherein a certain portion of the data originally written in the manner shown in FIG. 11A is updated, using an update command. A portion 195 of the data file is shown to be updated. Rather than rewriting the entire file in the memory system with the update, an updated portion 197 of the file is appended to the data previously written. A portion 199 of the data previously written is now obsolete. Although it is usually desirable to consolidate the updated file in order to free up space taken by obsolete data, this is usually not done while the host maintains the file opened but rather may be done in the background after the file is closed. After updating, the file is represented in the memory system FIT by data groups index entries (F0,D0), (F1,D3), (F2,D1), (F3,D2), in that order. The single data group (F0,D0) of FIG. 11A is again divided into pieces in FIG. 11D, one before the updated portion, the updated portion and one after the updated portion.

To further illustrate the use of variable length data groups, a sequence of several write operations involving the same file is shown by FIGS. 12A-12E in order. The original file data W1 is first written into two blocks of the memory system, as shown in FIG. 12A, with use of the write command. The file is then defined by two data groups, the first group starting at the beginning of a physical memory block and the second group being required after a physical memory block boundary. The file of FIG. 12A is then identified by the following sequence of index entries for the data groups: (F0,D0), (F1, D1).

In FIG. 12B, the file data written in FIG. 12A are updated by use of an update command. Updated file data U1 are written immediately following the previous group (F1,D1), with the previous version of the updated data becoming obsolete. Previous group (F0,D0) of FIG. 12A is shortened to a revised group (F0,D0) of FIG. 12B, and previous group (F1, D1) is shortened to group (F4,D2). The updated data are written in two groups (F2,D3) and (F3,D4) because they overlap a boundary of memory blocks. Some of the data are stored in a third memory block. The file is now described by the following sequence of index entries for the data groups: (F0,D0), (F2,D3), (F3,D4), (F4,D2).

The file of FIG. 12B is further modified in FIG. 12C by the insertion of new file data I1, using of the insert command. The new data I1 is written into the memory immediately following the previous group (F4,D2) of FIG. 12B, as new groups (F5,D6) and (F6,D7) of FIG. 12C because the inserted data overlap a boundary of memory blocks. A fourth memory block is used. Previous group (F0,D0) of FIG. 12B is split into shortened groups (F0,D0) and (F7,D5) in FIG. 12C, because of the insertion of the new data I1. The file is now described by the following sequence of index entries for the data groups: (F0,D0), (F5,D6), (F6,D7), (F7,D5), (F8,D3), (F9, D4), (F10,D2).

FIG. 12D shows the further modification of the data file of FIG. 12C that appends new data W2 to the end of the file, using the write command. New data W2 are written immediately following the previous group (F10,D2) of FIG. 12C, as new group (F11,D8) of FIG. 12D. The file is now described by the following sequence of index entries for the data groups: (F0,D0), (F5,D6), (F6,D7), (F7,D5), (F8,D3), (F9,D4), (F10, D2), (F11,D8).

A second update to the open file is shown in FIG. 12E, where updated file data U2 are written to the file of FIG. 12D by the host issuing an update command. The updated data U2 are written in FIG. 12E immediately following the previous group (F11,D8) of FIG. 12D, with the previous version of that data becoming obsolete. Previous group (F9,D4) of FIG. 12D is shortened to a revised group (F9,D4) in FIG. 12E, previous group (F10,D2) becomes fully obsolete, and previous group (F11,D8) is shortened to form a new group (F14,D9). The updated data are written in new groups (F12,D10) and (F13, D11) of FIG. 12E, overlapping a block boundary. A fifth block is now needed to store the file. The file is now described by the following sequence of index entries for the data groups: (F0,D0), (F5,D6), (F6,D7), (F7,D5), (F8,D3), (F9, D4), (F12,D10), (F13,D11), (F14,D9).

The offsets of the data of each file are preferably maintained continuous in the correct logical order after the file's creation or modification according to the preceding description. Therefore, as part of executing an insert command (FIG. 12C), for example, offsets of the inserted data provided by the host are continuous from the offset immediately preceding the insert and data already in the file after the insert are incremented by an amount of the inserted data. The update command most commonly results in data within a given address range of an existing file being replaced by a like amount of updated data, so the offsets of other data of the file usually need not be replaced.

It will be noted that all of the data allocation and indexing functions described above and illustrated by FIGS. 11 and 12 are performed by the controller of the memory system. Along with one of the write, insert or update commands, the host merely communicates the fileID and offsets of data within the file that are being sent to the memory system. The memory system does the rest.

An advantage of directly writing file data from the host into the flash memory in the manner just described is that the granularity or resolution of the data so stored may be maintained the same as that of the host. If a host application writes file data with a one-byte granularity, for example, that data may be also be written into the flash memory with a one-byte granularity. The amount and location of data within an individual data group is then measured in a number of bytes. That is, the same offset unit of data that is separately addressable within the host application file is also separately addressable within that file when stored in the flash memory. Any boundaries between data groups of the same file within a block are then specified in the index table to the nearest byte or other host offset unit. Similarly, boundaries between data groups of different files within a block are defined in the unit of the host offset.

It will be noted from FIGS. 12B and 12E that execution of an update command results in the physical space necessary to store the file being greater than the amount of data in the file. This is because data that have been replaced by the updates remain stored in the memory. It is therefore highly desirable to consolidate (garbage collect) the data of the file into less physical storage space by eliminating the obsolete, invalid data. More storage space therefore becomes available for other data.

It may also be noted that in addition to the file data updates of FIGS. 12B and 12E, the data insert of FIG. 12C results in the file data being stored out of order. That is, updates and inserts are added to the end of the file stored in memory at the time they are made, while they are nearly always logically positioned somewhere within the file. This is the case of the examples of FIGS. 12B, 12C and 12E. It can therefore be desirable to reorder the data of the file stored in the memory to match the order of the offsets within the file. This then improves the speed of reading the stored data since reading the pages and blocks in sequence will give the data of the file in their offset order. This also provides the maximum possible defragmentation of the file. But reordering the file data to make reading more efficient is not as important to the performance of the memory system as is file data consolidation, which potentially frees up one or more memory blocks for use to store other data. Reordering of the data in a file will therefore usually not be done by itself, where the benefit is not worth the added operating overhead, but can be done as part of many garbage collection operations with little or no added operating overhead.

The file of FIG. 12E includes obsolete data groups (gray portions) stored in the memory because of the two data updates U1 and U2 having been made. The amount of memory capacity being used to store the file is, as a result, substantially greater than the size of the file, as is apparent from FIG. 12E. Garbage collection is therefore appropriate. FIG. 13 provides an illustration of the result of garbage collecting the data file of FIG. 12E. That file, before garbage collection, takes up nearly five blocks of storage capacity (FIG. 12E), while the same file after garbage collection fits within slightly more than three memory cell blocks (FIG. 13). As part of the garbage collection operation, data are copied from the blocks where they are initially written into other erased blocks, and the original blocks then erased. If an entire file is data collected, its data may be copied into the new blocks with a physical order that is the same as the data logical offset order within the file. The updates U1 and U2, and the insert I1, for example, are stored after garbage collection (FIG. 13) in the same order as they appear in the host file.

Garbage collection also normally results in the formation of new and different data groups within the file being consolidated. In the case of FIG. 13, the file is described by the following new sequence of index entries for the new data groups: (F0,D0), (F1,D1), (F2,D2), (F3,D3). This is a far fewer number of data groups than exist with the state of the file shown in FIG. 12E. There is now one data group for each of the memory cell blocks into which data of the file have been copied. As part of the garbage collection operation, the file index table (FIT) is updated to reflect the new data groups forming the file.

Storage of Variable Sized Data Units

In the current operation of flash memory, it is conventional to map a given block of data in logical address space into a physical block or metablock of memory having the same data storage capacity as the amount of data in the data block. This makes operation of the memory system more efficient. But when there is a transformation of the data between the logical address space and the physical memory that changes the size of the logical data blocks before storage, this desired equivalence of size between logical and physical data blocks no longer exists. The conventional mapping scheme cannot then be used.

One technique to overcome this problem is to allocate intermediate logical addresses to irregularly sized groups of transformed data, and then map blocks of intermediate addresses to blocks of flash memory having equivalent sizes. But the change in size of such intermediate sized groups of data by subsequent updates creates significant fragmentation in the allocation of intermediate addresses to physical memory blocks. This results in more frequent data consolidation and garbage collection being necessary, which greatly reduces the performance of the memory system.

What has been found to accommodate such transformed or irregularly sized units of data, while still maintaining good performance of the memory system, is use of the direct data file techniques described in the preceding section. The use of variable sized data groups is particularly adapted to handle units of data of differing and changing amounts.

Figure 14:
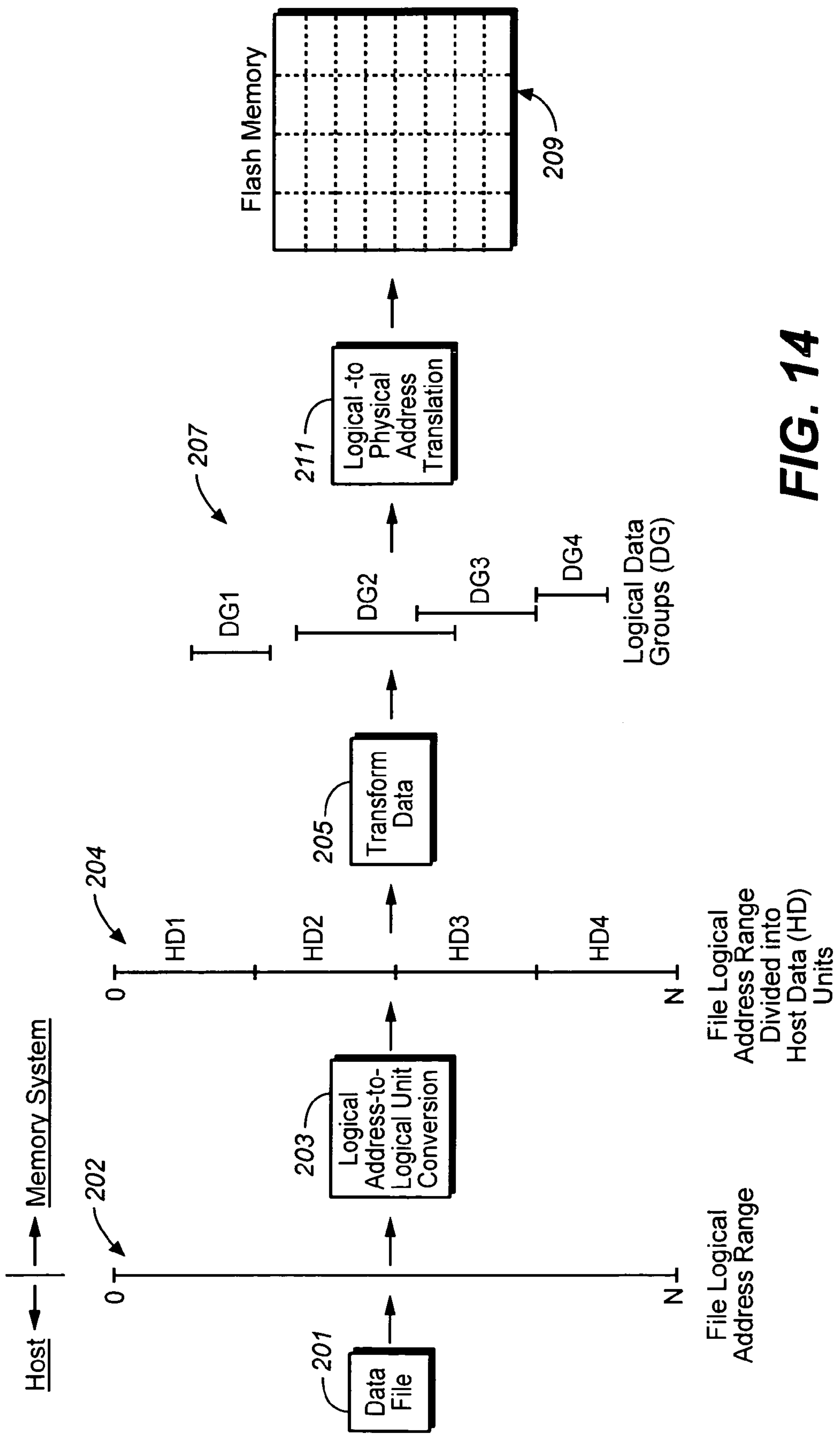
FIG. 14 shows operation of a direct data file memory system with data transformation, according to the present invention.

FIG. 14 illustrates an example of writing a data file with use of the direct data file techniques described above but where the data are transformed within the memory system in a manner that stores a different amount of data than that provided by the host. The data transformation may result from compression, encryption or other encoding of the received data before it is written into the memory. Compression algorithms have a primary purpose of significantly reducing the amount of data, in order to reduce the amount of physical memory necessary to store a given amount of data from a host. Data encryption processes, on the other hand, often increase the amount of data that are stored. The techniques described herein apply equally to either case and also to a situation where one part of the data being stored is increased size and another part decreased in size.

Referring to FIG. 14, data within a file 201 have logical offset addresses 202 that extend from 0 to N. The file offset addresses are provided by the host along with the data. This address space is divided within the memory system by a conversion 203 into contiguous units 204 of data HD1, HD2, HD3 and HD4. These host data units are then transformed, as indicated by a block 205, into respective logical data groups DG1, DG2, DG3 and DG4, as indicated at 207. For this illustration, the transformed data group DG2 is larger than the corresponding host data unit HD2, the transformed data group DG3 is the same size as the host unit HD3, and the other two data groups contain less data than their untransformed host data counterparts. More typically, however, the transformed data groups will either all be larger or all be smaller than their corresponding host data units, depending upon the type of transformation being performed. After data transformation, the logical data groups 207 are stored in a flash memory cell array 209 by assigning them physical addresses within the array, as indicated by block 211, similar to the direct data file techniques described above.

The individual host data units HD1 etc. of the file logical address range 203 are preferably chosen to contain an equal, or substantially equal, amount of data. This amount of data is also preferably set to equal that utilized by the data transformation 205. That is, at least many compression and encryption algorithms process only a set amount of data of a file at a time, and the size of the host data units HD1 etc. can be made equal to that amount. This amount can also often be chosen by setting a parameter of the transformation algorithm, so this amount and the size of the host data units HD1 etc. may be selected together to optimize operation of a particular system.

Figure 15:
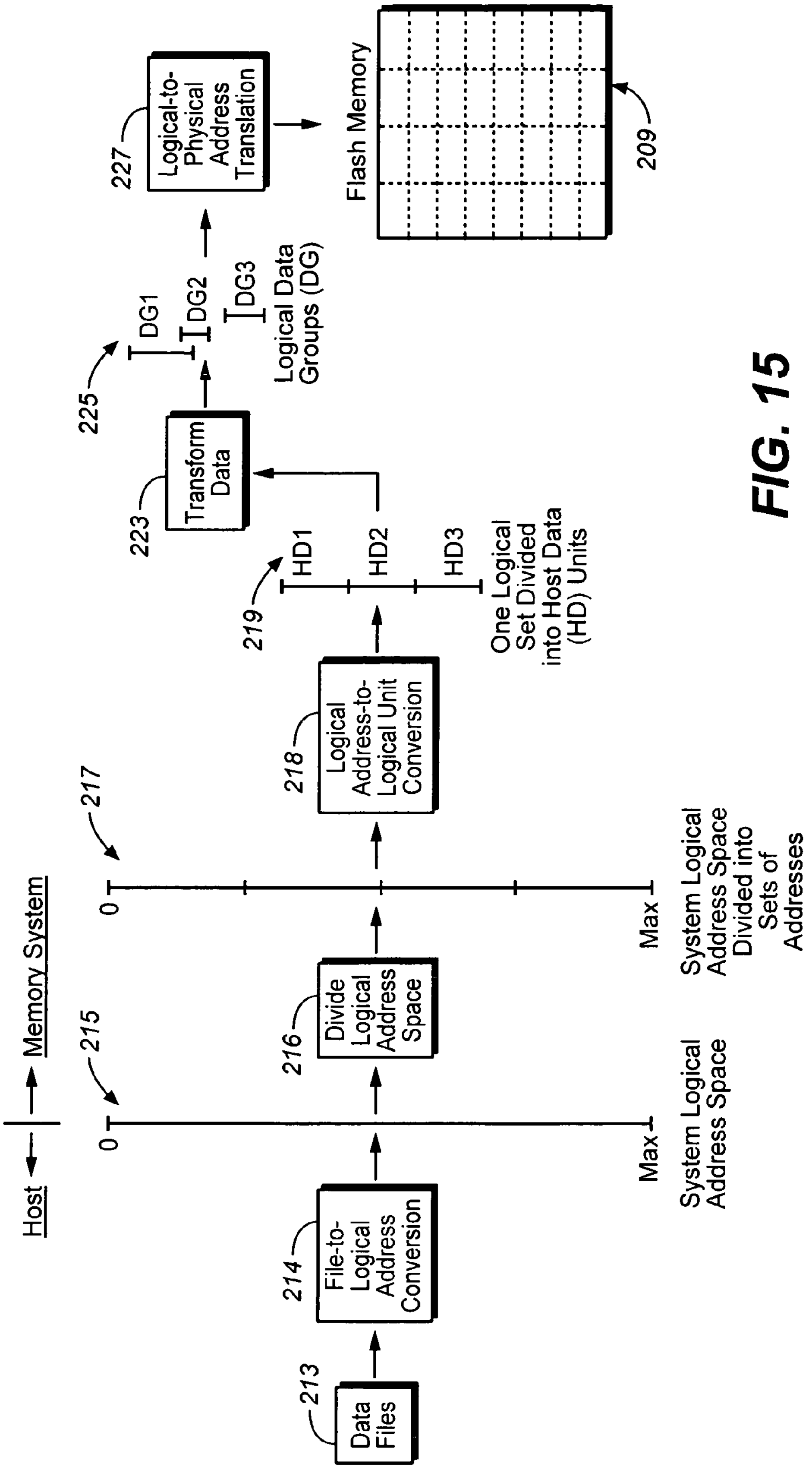
FIG. 15 shows operation of a logical address space memory system with data transformation, according to the present invention.

As FIG. 15 illustrates, these techniques are not limited to the host data file interface described above but rather may also be used where a single logical address space interfaces multiple files between the host and memory system. This is the traditional disk storage system interface. Data files 213 are assigned unique addresses by the host within a logical address space 215 by an address conversion function 214. As is well known, the host assigns logical addresses of a new file to unoccupied addresses within the address space 215 that may not be, and often are not, contiguous for a particular file. The memory system does not therefore have direct information about the logical addresses assigned to any particular file.

But the single logical address interface 215 of FIG. 15 may be divided, as indicated at 216, into contiguous sets 217 of data, the sets each preferably containing the same amount of data. Each set is then treated like a data file object, with its logical address range divided at 218 into logical host data units HD1, HD2 and HD3, as shown at 219. This is an implementation of a technique described in U.S. patent application Ser. No. 11/196,869 of Sergey A. Gorobets, filed Aug. 3, 2005; publication no. US 2007/0033323 A1. Addresses within each of the data sets 217 are mapped by a logical address conversion 218 into the host data units 219. The sizes of the host data (HD) units are preferably the same, or substantially the same, and preferably chosen to correspond to the amount of data transformed at a time by a transformation function 223. These host data (HD) units are therefore converted into corresponding ones of logical data groups (DG) of different sizes, as indicated at 225, in the same manner as in the process described above with respect to FIG. 14. The logical data groups are then stored in the memory 209 at physical addresses determined by the address translation 227.

In carrying out the data transformation 205 (FIG. 14) or 223 (FIG. 15), an entire one of the host data (HD) units of a logical set (204 or 219) is typically temporarily stored in the memory controller at one time, such as in the RAM 31 (FIG. 2). The stored HD unit is then encoded or otherwise transformed. Similarly, when modifying a host data unit that is stored in a transformed manner, data are read, retransformed and the some or all of the retransformed data unit then temporarily stored in RAM while being modified. This may therefore require a higher capacity RAM since current flash memory systems typically require storage capacity for only one page or metapage of data when performing programming and reading functions.

Although the memory systems of FIGS. 14 and 15 have been described to be transferring data to and from an external host, the "host" can alternatively be a software application program executed internal of the memory system. Application software stored within the flash memory array is loaded into the RAM 31 and executed by the controller processor 27 (FIG. 2), in addition to this processor controlling operation of the memory. Or, if necessary, an additional microprocessor can be added to the memory system for this purpose.

Figure 16:
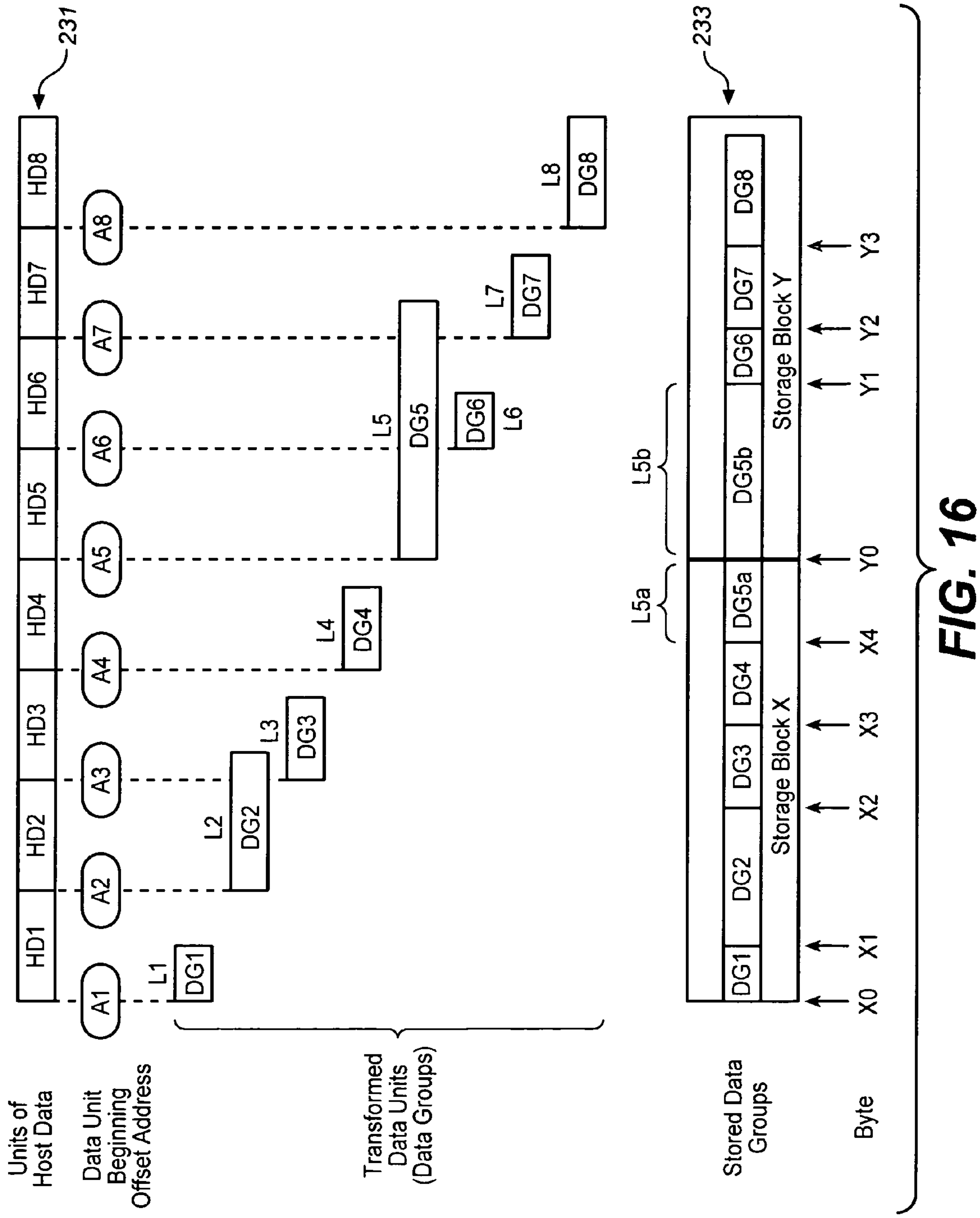
FIG. 16 is an illustrative example of the transformation of data in either of FIG. 14 or 15.

With an initial reference to FIG. 16, a technique for translating and storing the transformed logical data groups (DG) of either of the examples of FIG. 14 or 15 will be described. An example file or set 231 of data in FIG. 16 represents that of either one host file 201 of a host data file interface (FIG. 14) or a portion or all of the logical address space 215 (FIG. 15). The logical address range of the host data 231 is divided into equal sized host data units HD1, HD2, HD3, etc., each of which has a respective beginning logical address of A1, A2, A3, etc. The host data units HD1, HD2, HD3, etc. are individually transformed within the memory system, such as by compression, encryption or other type of encoding, into corresponding data groups DG1, DG2, DG3, etc., that have varying lengths L1, L2, L3, etc., respectively.

The transformed data groups DG1, DG2, DG3, etc. are then treated as the data groups of the direct data file operation described above with respect to FIGS. 11-13. The data groups are stored in the physical memory 233, two blocks or metablocks X and Y being illustrated. The data groups are stored in order next to each other, data group DG1 starting at address 0 of memory block X, data group DG2 beginning at address 1 of block X immediately after the end of DG1, and so on. Data group DG5 is split between blocks X and Y, in this example, so is divided into two sub-groups DG5*a* and DG5*b*, having respective lengths L5*a* and L5*b* and beginning memory addresses 4 in block X and 0 in block Y. As much of the data from the beginning of the group DG5 that fits into the block X is stored there, and then the remaining amount of the group DG5 is stored in the block Y.

The host in the example of FIG. 16 is unaware that its logical address space for data stored in the memory system is divided into host data units HD1, HD2, HD3 etc. The host is also unaware of the data transformation taking place in the memory system. When the host reads data from the memory system, the reverse of the writing process described with respect to FIG. 16 occurs. When a specified data file (FIG. 14) or data in specified addresses within a system logical address space (FIG. 15) are requested by the host, the stored data groups DG1, DG2, DG3, etc. are read from the storage blocks X and Y, individually reverse transformed into respective units of host data HD1, HD2, HD3, etc., which are then combined into the data group 231 that is sent to the host.

The physical locations of data groups (DG) corresponding to units of host data (HD) is maintained as part of the memory system overhead by a file index table (FIT). An example of a portion of such a table is given in FIG. 17 for the data storage illustrated in FIG. 16. This table is formed when the data are first written, is modified as the written data are modified and is used during read to find the data requested by the host. There is at least one line in the table for each stored data group (DG) of the data unit 231. The information for each data group, in columns of the table, include a column 235 giving the offset address A of the host data unit (HD) to which the data group corresponds. A column 237 stores the length L of the transformed data group (DG). The beginning byte location or other address of the physical memory 233 where the data group begins is provided in a pointer column 239.

There is one significant difference in this application of the direct data file techniques from what was described above with respect to FIGS. 11-13. Where data groups in that case of non-transformed data storage are readily combined in order to reduce their number, and thus reduce the size of the FIT and other overhead in keeping track of them, that is not the case with transformed data groups. Because the individual host data (HD) units are individually transformed, it is desired to continue to keep track of the respective individual corresponding transformed data groups (DG). This maintains a record of the boundaries between the stored data groups within the storage blocks, and thus allows separation of the data read from the storage blocks into the individual data groups. The corresponding host data (HD) units are then individually retransformed from the corresponding data group (DG) that is identified by one of the lines of the FIT.

Therefore, a column 241 is included in the FIT of FIG. 17 with a single bit that indicates for each data group whether it is to remain fixed. A "1" bit indicates this to be the case. By not merging the data groups, the identifications of the boundaries between the stored data groups are maintained. A "0" bit indicates that the data group may be combined with others, in the manner of the general direct data file description above with respect to FIGS. 11-13, and the Direct Data File Applications. This allows the memory system to store both transformed and non-transformed data. For data groups that have been transformed, the bit of column 241 is a "1", and for non-transformed data groups, this bit is a "0".

In a system storing both transformed and non-transformed data, a write command received from a host is converted within the memory system to one of two specific write commands. A Write command causes data received to be written to the memory as free data groups, which can be merged, according to the techniques of the foregoing section describing Direct Data File Storage. A Write_Group command causes data received to be written to the memory as fixed data groups, which cannot be merged, according to the description of this section. A fixed data group is defined by transmission from the data transformation function of a Write_Group command, followed by streamed data forming the group, and then a Close_Group command to define the end of the data group.

Another column 243 of the FIT of FIG. 17 indicates for each data group whether it is linked to another. This will occur when a data group is split between two memory blocks, such as data group DG5 being split between storage blocks X and Y in the example of FIG. 16. Two sub-groups are formed as a result. A "1" is stored in this column for each linked data sub-group, and a "0" for the groups that are not linked. In this example, each of sub-groups 244 and 246 has a "1" in this column to show that it is only a part of the data group A5. This says that the two are sub-groups which may be combined back into a single data group A5 during any future data consolidation or garbage collection if this results in the entire data group A5 being stored in a single memory block. This is an exception to the restriction caused by the bit "1" in column 241 that does not allow the individual data groups to be combined. The offset address and length of the data group A5 are included only once in FIG. 17, as part of the record 244 for the first of the two sub-groups. Alternatively, these data may be repeated in both of the records 244 and 246.

A final column 245 is provided in the example FIT of FIG. 17 to mark the data group that is the end of a host file. The last data group in the table of FIG. 17 is so marked with a "1" and the others are indicated to be other than the last data group of a host file by being marked with a "0". This is used when the memory system has a data file object interface with the host, the case shown in FIG. 14. But when the host interface is the continuous single logical address space of FIG. 15, it will not usually be used.

It will be noticed that the length of a data group, such as the length L3 of the data group DG3, is not equal to the difference between the beginning address A3 of this data group and the beginning address A4 of the next data group. This is, of course, because the transformation of the host data unit HD3 has changed its length.

Figure 18:
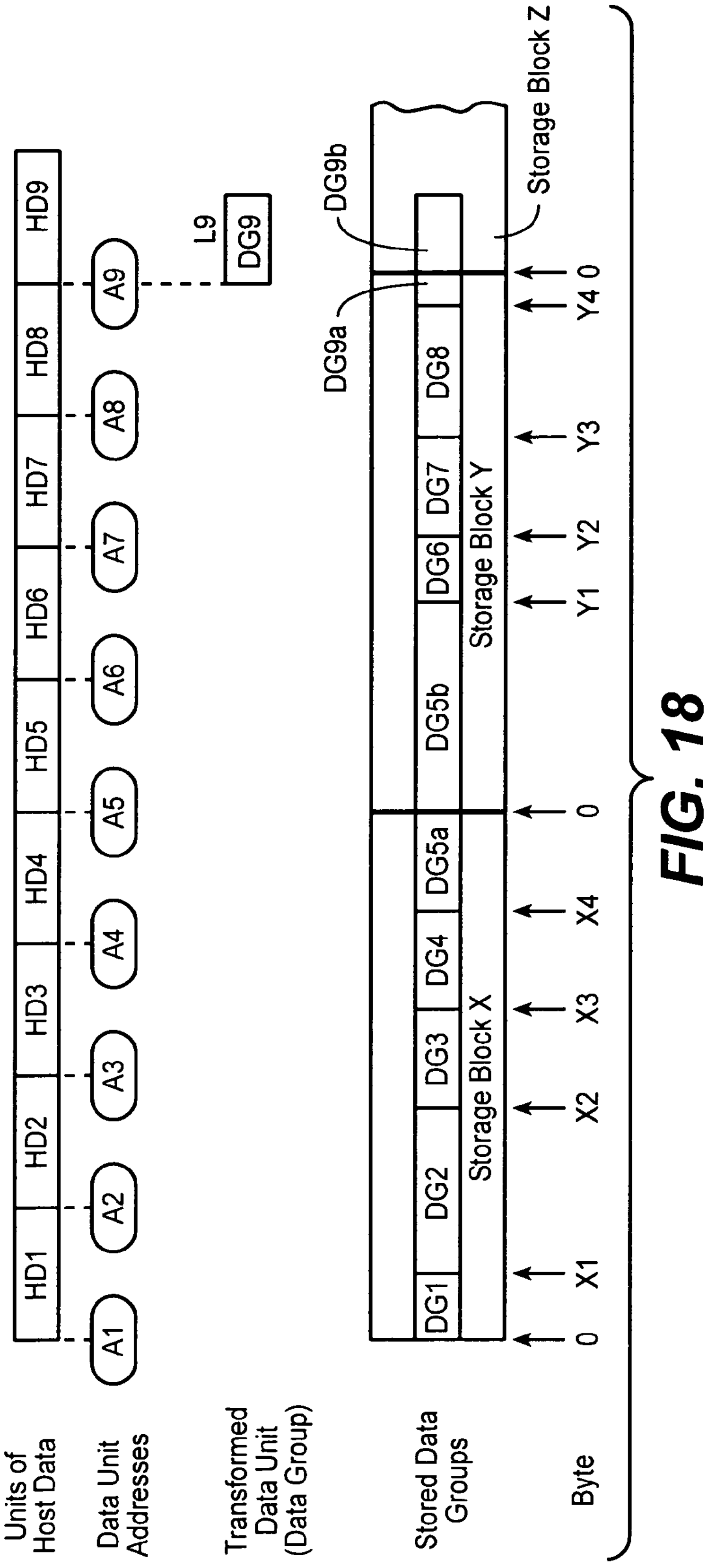
FIG. 18 illustrates the appending of data to those stored by the example of FIG. 16.

FIGS. 18 and 19 show the changes to respective FIGS. 16 and 17 that could occur if data are later appended to the data file initially represented by host data units HD1-HD8. In this case, a host data group HD9 is being added to the end of the file. This host data unit is individually transformed into a data group DG9. A first portion of the transformed data group DG9 is then stored, in this example, in the space that remains at the end of the memory storage block Y, and the remainder of the data group DG9 is stored at the beginning of a new storage block Z. Alternatively, the data group DG9 could be stored in a common block that is also used to store one or more data groups of other files. The use of common blocks is described in the Direct Data File Applications.

In this example, the FIT of FIG. 17 is updated by adding two entries at its end, as shown in FIG. 19. One entry is for the sub-group in storage block Y and the other for the sub-group in storage block Z. The "Linked" bits are set to "1" for each of these sub-groups, and the "End of File" bit is moved to the last sub-group.

Figure 20:
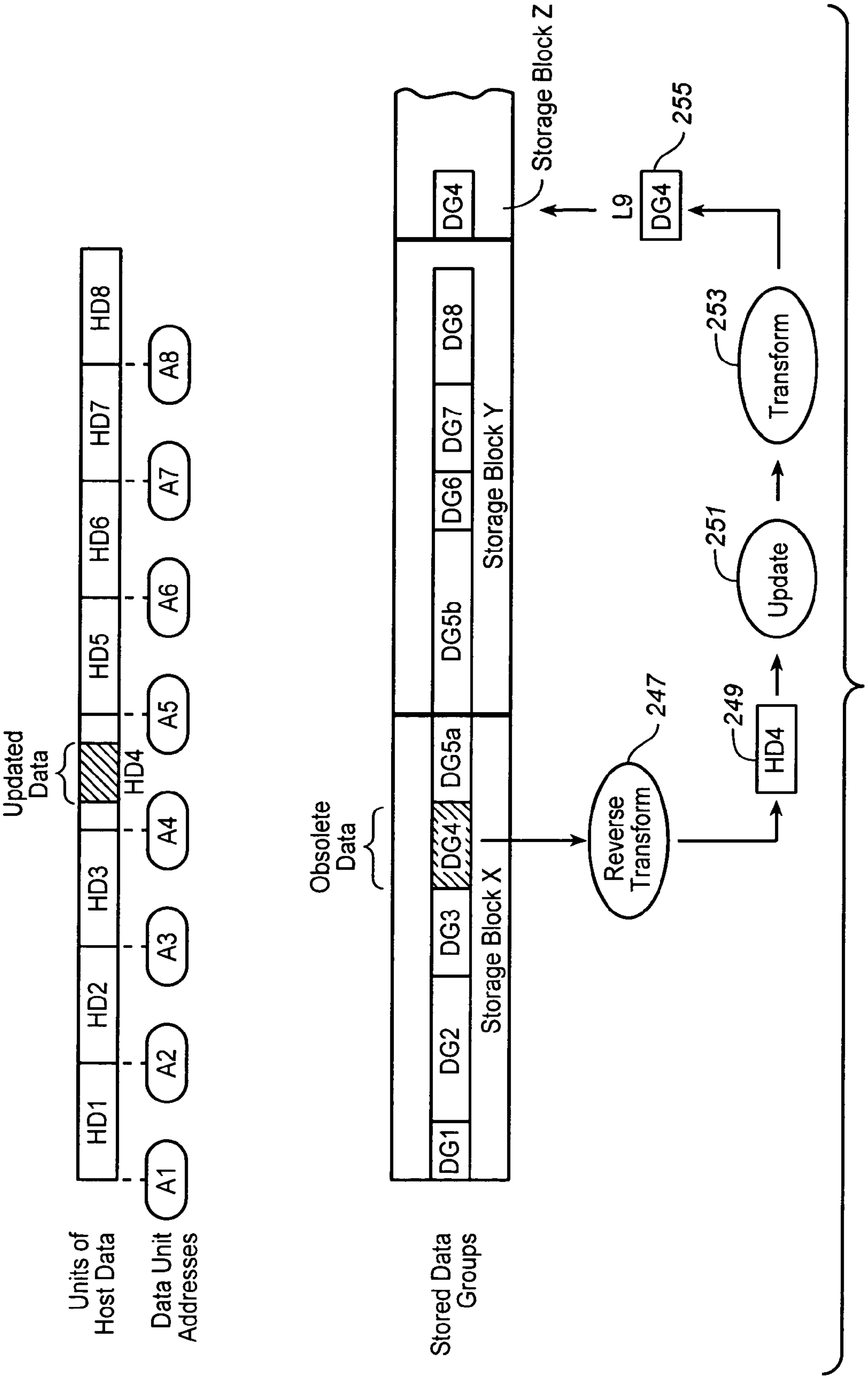
FIG. 20 illustrates the updating of data stored by the example of FIG. 13.

FIGS. 20 and 21 show another type of change to the stored data groups of respective FIGS. 16 and 17. In this case, a portion of the host data unit HD4 is being updated. The update process includes first reading the entire corresponding transformed data group DG4 from the memory storage block X, and then reverse transforming the data of this group, as indicated by 247 of FIG. 20, to reconstruct the original host data unit (HD4) 249. Once the original host data unit is obtained, it is updated by the host, as indicated at 251, in this case replacing part of the original data. The updated host data unit is then transformed by the same algorithm used to transform the original host data unit HD4, indicated at 253. This results in an updated data group (DG4) 255 having a length L9 that will typically be different than the length L4 of the original data group.

The updated data group is shown in FIG. 20 to be stored entirely within a new storage block Z, rather than partially in storage block Y, as an alternative to the storage of appended data group DG9 of FIG. 18. This avoids splitting the added data group into two sub-groups. The original data group DG4 is then marked as obsolete and eliminated the next time the stored data are consolidated or garbage collected.

The original FIT of FIG. 17 is then updated to reflect this change. As shown in FIG. 21, information on the line for the data group DG4 is changed to show its new length L9 and its new starting memory address Z0. The End of File bit remains set for the data group DG8, since it is still the last data group of the unit.

FIGS. 20 and 21 illustrate a form of what is referred to as read/modify/write. This may be carried out in ways that use different amounts of buffer memory such as the RAM 31 (FIG. 1). One way is to read out the entire data group (DG) being modified, retransform it, store the entire resulting host data group (DG) in buffer memory, modify the stored data by overwriting some of it with new incoming data, and then transform the stored modified data for rewriting into the memory. Another way, which requires less buffer memory, is to store only the portion of the retransformed data that is not being modified and then read the stored data, combine them with new incoming replacement data and then transform the modified data for writing into the memory.

CONCLUSION

Although the various aspects of the present invention have been described with respect to exemplary embodiments thereof, it will be understood that the present invention is entitled to protection within the full scope of the appended claims.

It is claimed:

1. A non-volatile memory system, comprising:

a flash memory divided into individual blocks of data storage elements, the individual blocks containing a minimum number of storage elements that are erased together prior to writing data therein, wherein each of said individual blocks stores up to a given amount of data, and a controller connected with the flash memory and including a microprocessor operated by firmware, wherein the controller operates to divide data received by the flash memory into equal sized individual units of data, said units of data having contiguous logical addresses within a continuous logical address range, and wherein the controller operates to transform said individual units of data into corresponding groups of data in a manner that changes the amount of data in at least some of the units so that the groups of data corresponding to said at least some units contain amounts of data different than that in said at least some units, and to store the groups of data in the blocks of storage elements, each of said units containing an amount of data equal to or less than said given amount of data, and wherein the controller identifies storage locations by physical addresses of data groups having physical boundaries coincident with logical boundaries of the groups, some of the groups being stored entirely within individual blocks of storage elements and others of the groups being stored as separate sub-groups in two different blocks of storage elements with boundaries thereof within blocks of storage elements, the groups and sub-groups being stored contiguously within the individual blocks of storage elements and the sub-groups containing an amount of data less than said given amount, wherein the controller further maintains a central table with entries for the individual groups and sub-groups of data that include the physical addresses thereof.

2. The memory system of claim 1, wherein the controller further operates to maintain the central table with physical addresses of the sub-groups separate and distinct from the physical addresses of the groups of data.

3. The memory system of claim 1, wherein the controller further operates to transform the received data by at least one of encoding, compressing or encrypting the data.

4. The memory system of claim 3, wherein the controller further operates to transform the received data in a manner that reduces the amount of data that existed prior to the transformation.

5. The memory system of claim 3, wherein the controller further operates to transform the received data in a manner that increases the amount of data that existed prior to the transformation.

6. The memory system of claim 1, wherein the controller further operates to transform data received within distinct units of logical addresses that contain equal amounts of data.

7. The memory system of claim 1, wherein the data received by the controller that are transformed originate outside of the memory system.

8. The memory system of claim 1, wherein the data received by the controller that are transformed originate with an application being executed by the controller.

9. The memory system of claim 1, wherein the storage elements include electrically conductive floating gates.

10. The memory system of claim 1, wherein the controller additionally includes a circuit dedicated to perform at least a portion of the transformation of the received data.

11. The memory system of claim 1, wherein the controller further operates to store more than one bit of data in individual ones of the storage elements.

12. The memory system of claim 1, wherein the controller additionally operates to divide a logical address range of the data received by the memory system into a plurality of distinct units of continuous logical addresses, the distinct units individually capable of storing an amount of data equal to or less than said given amount of data.

13. The memory system of claim 1, wherein the controller divides received data into said distinct units, said distinct units being of equal size, each of said distinct units individually containing an amount of data equal to or less than a storage capacity of the individual blocks of storage elements, the data within each of said distinct units having contiguous logical addresses within a logical address range.

14. The memory system of claim 1, wherein one of said blocks of storage elements stores a first data group, such one block having storage capacity available for data in addition to the first data group, the controller storing a sub-group of a second data group distinct from the first data group in such block.

* * * * *